(12) United States Patent
Webster et al.

(10) Patent No.: US 8,629,210 B2
(45) Date of Patent: Jan. 14, 2014

(54) ZWITTERIONIC/AMPHIPHILIC PENTABLOCK COPOLYMERS AND COATINGS THEREFROM

(75) Inventors: Dean C. Webster, Fargo, ND (US); Robert J. Pieper, West Bend, WI (US); Mohammed J. Nasrullah, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 266 days.

(21) Appl. No.: 13/123,323

(22) PCT Filed: Oct. 9, 2009

(86) PCT No.: PCT/US2009/060146
§ 371 (c)(1),
(2), (4) Date: May 10, 2011

(87) PCT Pub. No.: WO2010/042804
PCT Pub. Date: Apr. 15, 2010

(65) Prior Publication Data
US 2011/0218290 A1 Sep. 8, 2011

Related U.S. Application Data

(60) Provisional application No. 61/104,343, filed on Oct. 10, 2008.

(51) Int. Cl.
*C08F 283/12* (2006.01)
*C09D 5/16* (2006.01)

(52) U.S. Cl.
USPC .......................................... 524/505; 525/479

(58) Field of Classification Search
USPC .......................................... 524/505; 525/479
See application file for complete search history.

(56) References Cited

U.S. PATENT DOCUMENTS

| | | | |
|---|---|---|---|
| 4,493,926 A | 1/1985 | Williams, Jr. et al. | |
| 5,036,077 A | 7/1991 | Van Broeck et al. | |
| 6,030,632 A | 2/2000 | Sawan et al. | |
| 6,221,954 B1 | 4/2001 | Bechara et al. | |
| 6,224,579 B1 | 5/2001 | Modak et al. | |
| 6,294,589 B1 | 9/2001 | Moody | |
| 6,384,173 B1 | 5/2002 | O'Lenick | |
| 6,939,554 B2 | 9/2005 | McDonald et al. | |
| 7,585,922 B2 * | 9/2009 | Farcet ........................... | 525/477 |
| 2002/0099104 A1 | 7/2002 | Muranaka et al. | |
| 2003/0220415 A1 | 11/2003 | Worley et al. | |
| 2004/0077747 A1 | 4/2004 | Payne | |
| 2005/0159695 A1 | 7/2005 | Cullen et al. | |
| 2007/0154621 A1 | 7/2007 | Raad | |
| 2007/0212326 A1 | 9/2007 | Ochs et al. | |
| 2011/0171279 A1 | 7/2011 | Chisholm | |
| 2011/0195041 A1 | 8/2011 | Chisholm et al. | |

FOREIGN PATENT DOCUMENTS

| | | |
|---|---|---|
| WO | 99/31036 | 6/1999 |
| WO | WO 2010/042935 | 4/2010 |

OTHER PUBLICATIONS

United States Patent Office Action for U.S. Appl. No. 12/917,618 dated Aug. 17, 2012 (8 pages).
Chen, Z. et al., "Novel, UV-curable coatings containing a tethered biocide: Synthesis, characterization, and antimicrobial activity," Journal of Biomedical Materials Research A, Nov. 2010, vol. 95A, Iss. 2, pp. 486-494.
McMurray, L. et al., "Triclosan targets lipid synthesis," Nature, Aug. 6, 1998 vol. 394, pp. 531-532.
United States Patent Office Final Rejection for U.S. Appl. No. 13/123,318 dated Apr. 9, 2013 (8 pages).
United States Patent Office Final Rejection for U.S. Appl. No. 12/917,618 dated May 31, 2013 (8 pages).
Andrews, J.M., "Determination of minimum inhibitory concentrations," J. of Antimicrobial Chemotherapy (2001) 48:5-16.
Bhargava, H.N. et al., "Triclosan: applications and safety," Am. J. Infect. Control (1996) 24:209-218.
Braunecker, W.A. et al., "Controlled/living radical polymerization: features, developments and perspectives," Prog. Polym. Sci. (2007) 32(1):93-146.
Callow, M.E. et al., "Marine biofouling: a sticky problem," Biologist (2002) 49(1):10-14.
Campbell, L. et al., "Triclosan," Dermatitis (2006) 17:204-207.
Carman, M. et al., "Engineered antifouling microtopographies—correleating wettability with cell attachment," Biofouling (2006) 22(1/2):11-21.
Casse, F. et al., "Combinatorial materials research applied to the development of new surface coatings. V. Application of a spinning water-jet for the semi-high throughput assessment of the attachment strength of marine fouling algae," Biofouling (2007) 23(1/2):121-130.
Chang, Y. et al., "Highly protein-resistant coatings from well-defined diblock copolymers containing sulfobetains," Langmuir (2006) 22:2222-2226.
Cheng, G. et al., "Inhibition of bacterial adhesion and biofilm formation on switterionic surfaces," Biomaterials (2007) 28:4192-4199.
Chisholm, B.J. et al., "Combinatorial materials research applied to the development of new surface coatings VII: an automated system for adhesion testing," Rev. Sci. Instr. (2007) 78(7):072213/1-072213/9.

(Continued)

*Primary Examiner* — Robert D. Harlan
(74) *Attorney, Agent, or Firm* — Michael Best & Friedrich LLP

(57) ABSTRACT

A zwitterionic/amphiphilic pentablock copolymer was prepared using atom transfer radical polymerization (ATRP). The pentablock copolymer is prepared for the atom transfer radical polymerization of a PDMS-PEO-Br macroinitiator and SBMA. The pentablock copolymer is incorporated into a polyurethane coating composition which is useful for antifouling and/or fouling release applications.

13 Claims, 19 Drawing Sheets

(56) References Cited

OTHER PUBLICATIONS

Chisholm, B.J. et al., "Combinatorial materials research applied to the development of new surface coatings," Progress Org. Coatings (2006) 57(2):115-122.

Chisholm, B.J. et al., "Combinatorial materials research applied to the development of new surface coatings. VIII: Overview of the high-throughput measurement systems developed for a marine coating workflow," Appl. Surf. Sci. (2007) 253(3):692-698.

Coessens, V. et al., "Function polymers by atom transfer radical polymerization," Prog. Polym. Sci. (2001) 26(3):337-377.

Estes, T. et al., "Settlement and release of balanus and ulva as a function of PDMS elastomer surface energy," Polymer Preprints (2004) 45(1):610-611.

Finlay, J.A. et al., "Settlement of ulva zoospores on patterned fluorinated and PEGylated monolayer surfaces," Langmuir (2008) 24(20):503-510.

Gudipati, C.S. et al., "The antifouling and fouling-release performance of hyperbranched fluoropolymer (HBFB)-poly(ethylene glycol) (PEG) composite coatings evaluated by adsorption of biomacromolecules and the green fouling alga ulva," Langmuir (2005) 21:3044-3053.

Hoipkemeier-Wilson, L. et al., "Antifouling potential of lubricious, micro-engineered, PDMS elastomers against zoospores of the green fouling alga ulva (enteromorpha)," Biofouling (2004) 20(1):53-63.

Hume, E.B.H. et al., "The control of *Staphylococcus epidermidis* biofilm formation and in vivo infection rates by covalently bound furanones," Biomaterials (2004) 25(20):5023-5030.

Jang, H.-J. et al., "Microarray analysis of toxicogenomic effects of triclosan on *Staphylococcus aureus*," Appl. Microbiol. Biotech. (2008) 78(4):695-707.

Jarvis, W.R., "The Lowbury Lecture. The United States approach to strategies in the battle against healthcare-associated infections, 2006: transitioning from benchmarking to zero tolerance and clinician accountability," J. Hosp. Infect. (2007) 65 Suppl. 2:3-9.

Johnson, R.M. et al., "Copper ATRP catalyst with quadridentate amine ligands: the effect of steric and electronic tuning on the polymerization of methyl methacrylate," Macromol. (2000) 33(23):8618-8628.

Jones, R.D. et al., "Triclosan: a review of effectiveness and safety in healthcare savings," Am. J. Infect. Control (2000) 28:184-196.

Kamigaito, M. et al., "Metal-catalyzed living radical polymerization," Chem. Rev. (2001) 101(12):3689-3745.

Kugel, A. et al., "Combinatorial materials research applied to the development of new surface coatings XII: novel, environmentally friendly antimicrobial coatings derived from biocide-functional acrylic polyols and isocyanates," J. Coat. Technol. Res. (2009) 6(1):107-121.

Kugel, A. et al., "Combinatorial exploration of tethered biocides in marine coatings," Center for Nanoscale Science & Engineering, Presented at ICE Conference Nov. 2006, 1 page.

Kugel, A. et al., "Antimicrobial polysiloxane polymers and coatings containing pendant levofloxacin," Polym. Chem. (2010) 1:442-452.

Kwakman, P.H.S. et al., "Treatment and prevention fo *Staphylococcus epidermidis* experimental biomaterial-associated infection by bactericidal peptide 2," Antimicrobial Agents Chemo. (2006) 50(12):3977-3983.

Lobry, J.R. et al., "Maintenance requirements of *Escherichia coli* ATCC 25922 in the presence of subinhibitory concentrations of various antibiotics," J. Antimicrob. Chemo. (1992) 29(2):121-127.

Majumdar, P. et al., "Combinatorial materials research applied to the development of new surface coatings IX: an investigation of novel antifouling/fouling-release coatings containing quaternary ammonium salt groups," Biofouling (2008) 24(3):185-200.

Majumdar, P. et al., "High throughput combinatorial characterization of thermosetting siloxane-urethane coatings having spontaneously formed microtopographical surfaces," J. Coat. Tech. Res. (2007) 4(2):131-138.

Matyjaszewski, K. et al., "Atom transfer radical polymerization," Chem. Rev. (2001) 101(9):2921-2990.

Matyjaszewski, K., "Macromolecular engineering: from rational design through precise macromolecular synthesis and processing to targeted macroscopic material properties," Prog. Polym. Sci. (2005) 30(8-9):858-875.

Nasrullah, M.J. et al., "Exploration of copper beads as catalyst for atom transfer radical polymerization of styrene," Polym. Preprints (2008) 49(2):113-114.

Owens, D.K. et al., "Estimation of the surface free energy of polymers," J. Appl Polym. Sci. (1969) 13(8):1741-1747.

Percec, V. et al., "Ultrafast synthesis of poly(methyl acrylate) and poly(methyl acrylate)-b-poly(vinyl chloride)-b-poly(methyl acrylate) by the Cu(0)/tris(2-dimethylaminoethyl)amine-catalyzed living radical polymerization and block copolymerization of methyl acrylate initiated with 1,1-chloroiodoethane and α,ω-Di(iodo)poly(vinyl chloride) in dimethyl sulfoxide," J. Polym. Sci: Part A: Poly. Chem. (2005) 43:1948-1954.

Percec, V. et al., "Ultrafast synthesis of poly(methyl methacrylate)-b-poly(vinyl chloride)-b-poly(methyl methacrylate) block copolymers by the Cu(p)/tris(2-dimethylaminoethyl)amine-catalyzed living radical block copolymerization of methyl methacrylate initiated with α, ω -di(iodo)poly(vinyl chloride) in the presence of dimethyl sulfoxide at 25 degrees C.," J. Polym. Sci. Part A: Polym. Chem. (2005) 43(8):1660-1669.

Percec, V. et la., "Ultrafast synthesis of ultrahigh molar mass polymers by metal-catalyzed living radical polymerization of acrylates, methacrylates, and vinyl chloride mediated by SET at 25 degrees C," J. Amer. Chem. Soc. (2006) 128:14156-14165.

Pieper, R.J. et al., "A combinatorial approach to study the effect of acrylic polyol composition on the properties of crosslinked siloxane-polyurethane fouling-release coatings," J. Coatings Tech & Res. (2007) 4(4):453-461.

Ramachandran, T. et al., "Antimicrobial textiles—an overview," J. Institution of Engineers (India) (2004) 84(TX2):42-47.

Schweizer, H.P., "Triclosan: a widely used biocide and its link to antibiotics," FEMS Microbiology Letters (2001) 202(1):1-7.

Stafslien, S. et al., "Combinatorial materials research applied to the development of new surface coatings. IV. A high-throughput bacterial biofilm retention and retraction assay for screening fouling—release performance of coatings," Biofouling (2007) 23(1/2):45-54.

Stafslien, S.J. et al., "Combinatorial materials research applied to the development of new surface coatings 1: a multiwell plate screening method for the high-throughput assessment of bacterial biofilm retention on surfaces," J. Comb. Chem. (2006) 8:156-162.

Stafslien, S.J. et al., "Combinatorial materials research applied to the development of new surface coatings VI; an automated spinning water jet apparatus for the high-throughput characterization of fouling-release marine coatings," Review Sci. Instr. (2007) 78(7):072204/1-072204/6.

Stafslien, S.J. et al., "Combinatorial materials research applied to the development of new surface coatings. III. Utilization of a high-throughput multiwell plate screening method to rapidly assess bacterial biofilm retention on antifouling surfaces," Biofouling (2007) 23(1/2):37-44.

Vaidya, A. et al., "Synthesis and surface properties of environmentally responsive segmented polyurethanes," J. Colloid Interf. Sci. (2002) 249:235-245.

Wang, C. et al., "Role of ClpP in biofilm formation and virulence of *Staphylococcus epidermidis*," Microbes and Infect. (2007) 9(11):1376-1383.

Wang, J.H. et al., "Dynamic contact angles and contact angle hysteresis of plasma polymers," Langmuir (1994) 10(10):3887-3897.

Webster, D.C. et al., "Mini-review: combinatorial appraoches for the design of novel coating systems," Biofouling (2007) 23(3):179-192.

Webster, O.W., "Living polymerization methods," Science (1991) 251(4996):887-893.

Zhang, Z. et al., "Superlow fouling sulfobetaine and carboxybetaine polymers on glass slides," Langmuir (2006) 22:10072-10077.

Zhang, Z. et la., "Surface grafted sulfobetaine polymers via atom transfer radical polymerization as superlow fouling coatings," J. Phys. Chem. B. (2006) 110:10799-10804.

International Search Report and Written Opinion for Application No. PCT/US2009/060388 dated Apr. 29, 2010 (11 pages).

International Search Report and Written Opinion for Application No. PCT/US2009/060146 dated May 7, 2010 (7 pages).

(56) References Cited

OTHER PUBLICATIONS

Choi, S. et al., Novel approach to anti-fouling and fouling-release marine coatings based on dual-functional siloxanes, Macromol. Symp. (2007), 249-250, pp. 660-667.

United States Patent Office Action for U.S. Appl. No. 13/123,318 dated Jun. 13, 2012 (9 pages).
United States Patent Office Action for U.S. Appl. No. 12/917,618 dated Jun. 7, 2012 (9 pages).

* cited by examiner

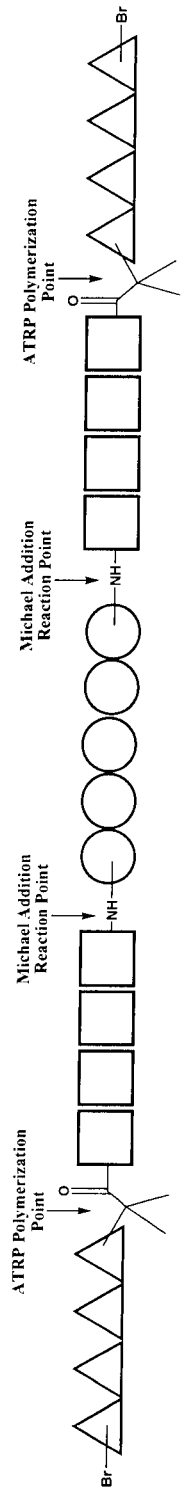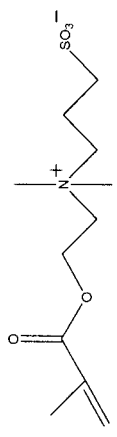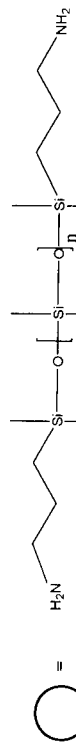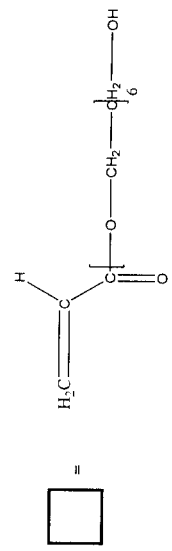
FIG. 2

ZWITTERIONIC/AMPHIPHILIC PENTABLOCK COPOLYMERS AND COATINGS THEREFROM

CROSS-REFERENCE TO RELATED APPLICATIONS

This application is a national stage filing under 35 U.S.C. 371 of International Application No. PCT/US2009/060146, filed Oct. 9, 2009, which claims the benefit of U.S. Provisional Patent Application Ser. No. 61/104,343, entitled, "Zwitterionic/Amphiphilic Pentablock Copolymers and Coatings Therefrom," filed Oct. 10, 2008, which are hereby incorporated by reference in their entireties.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N00014-07-1-1099 awarded by Office of Naval Research.

FIELD OF THE INVENTION

The present invention is related to coatings having anti-adherent properties. In particular, it relates to zwitterionic/amphiphilic pentablock copolymers and crosslinked polyurethane marine coatings.

BACKGROUND OF THE INVENTION

It is desirable to have underwater marine coatings that deter fouling by marine organisms through non-toxic means. One approach to solving this problem is by preparing fouling-release coatings. Fouling-release coatings do not suppress the settlement of fouling organisms through chemical means, such as biocides. Instead, organisms can only form a weak adhesive bond to the coating and are thus easily dislodged by shear forces.

Coatings based on crosslinked poly(dimethysiloxane) (PDMS) elastomers have low surface energy and may function as fouling-release coatings. Several such systems are available commercially. PDMS elastomers suffer from many disadvantages such as their poor adhesion to many substrates. PDMS elastomers are also mechanically weak and easily damaged. In addition, while many marine organisms such as barnacles, tubeworms, etc. cannot easily adhere to PDMS elastomers, other organisms, such as diatoms, can adhere well, resulting in the formation of undersirable "slimes" on PDMS coatings.

It has been recognized in the research community that poly(ethylene oxide) (PEO) and zwitterionic based materials are commonly used as protein resistant materials. Chang et. al. "Highly Protein-Resistant Coatings from Well-Defined Diblock Copolymers Containing Sulfobetains," Langmuir, 2006, Vol 22, pp. 2222-2226, designed diblock copolymers with fixed polypropylene backbones and a range of chain lengths of polysulfobetaine poly(SBMA) synthesized via atom transfer radical polymerization (ATRP). The copolymers were absorbed on to methyl (CH3)-terminated self-assembled monolayers (SAM) and nonspecific protein absorption was compared. In another study done by Cheng et. al., "Inhibition of Bacterial Adhesion and Biofilm Formation on Zwitterionic Surfaces," Biomaterials, 2007, 28, 4192-4199, long chain poly(SBMA) were grafted on to SAMs via ATRP and studied for long term and short term protein adsorption as well as biological evaluation of SAMs surface properties over time. It was found that the longer chain length of the zwitterionic moiety greatly affected the reduction of protein adsorption due to surface packing. However, SAMs are not suitable for use as durable coatings because SAMs are difficult to prepare and fail to have any long-term durability.

Amphiphilic compounds are designed to have both hydrophobic and hydrophilic moieties on one compound. These compounds have gained popularity for applications involving non-fouling biomaterials based on the idea that surfaces with amphiphilic compounds will form nanoscale heterogeneities, thus creating a surface topography that is unsuitable for the proliferation and adsorption of proteins and marine microfoulers.

It is challenging to design a practical coating system for underwater use that contains either PEO or poly(SBMA). Typically, the coating is too hydrophilic and swells excessively when immersed in water. Excessive swelling results in a coating that has poor mechanical properties, thus not providing the durability needed for the coating application.

A self-stratified siloxane-polyurethane coating system has been shown to have good fouling-release properties. The low surface energy of PDMS is obtained, while the bulk properties are that of polyurethane. Pieper et al., "A Combinatorial Approach to Study the Effect of Acrylic Polyol Composition on the Properties of Crosslinked Siloxane-Polyurethane Fouling-Release Coatings," Journal of Coatings Technology and Research, 2007, Vol. 4, No. 4, pp. 453-461, studied siloxane-urethane coatings containing aminopropyl terminated poly(dimethylsiloxane) (APT-PDMS), an acrylic polyol, and an aliphatic isocyanate. These materials were selected for their physical, mechanical and fouling-release performance properties. The results of the study were explained by the self-stratifying mechanism in which the low surface energy PDMS preferentially migrates to the surface of the coating while the bulk of the coating remains as the acrylic polyurethane. The fouling release properties of some of the coatings were good for the green macroalga Ulva sporelings but only slightly improved for the Navicula diatoms when compared to standard silicones.

It is an object of the present invention to prepare zwitterionic/amphiphilic pentablock copolymers.

It is another object of the present invention to prepare polyurethane coatings from the zwitterionic/amphiphilic pentablock copolymers such that the polyurethane coatings having anti-adherent properties.

It is another object of the present invention to prepare anti-fouling marine coatings from zwitterionic/amphiphilic pentablock copolymers which are easy to prepare and have long-term durability.

SUMMARY OF THE INVENTION

By the present invention, a zwitterionic/amphiphilic pentablock copolymer was prepared using atom transfer radical polymerization (ATRP). The pentablock copolymer was prepared from the atom transfer radical polymerization of a PDMS-PEO-Br macroinitiator and SBMA. The pentablock copolymer is further incorporated into a curable polyurethane coating composition. The cured coating is non-fouling, anti-fouling, and has an amphiphilic surface. These curable coating compositions are useful for applications where anti-fouling, non-fouling, and/or anti-adherent properties are desired. In general, the curable polyurethane coating composition comprises the pentablock copolymer, a polyol and a polyisocyanate. During the curing cycle, the pentablock copolymer reacts with the isocyanate groups of the polyisocyanate crosslinker via secondary amine groups at the junction of the PDMS and PEO segments while forming a cured coating. The curable coating composition may be applied to a variety of substrates and/or objects where the curable coating composition is subsequently cured resulting in an object coated with the cured coating which is non-fouling, anti-fouling, and/or has an amphiphilic surface.

Additional objects and advantages of the invention will be set forth in part in the description which follows, and in part, will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principals thereof, and in which:

FIG. 2 is an illustration showing Atom Transfer Radical Polymerization Reactants and a Zwitterionic/amphiphilic penta-block copolymer product.

DETAILED DESCRIPTION OF THE PREFERRED EMBODIMENTS

Figure 1:
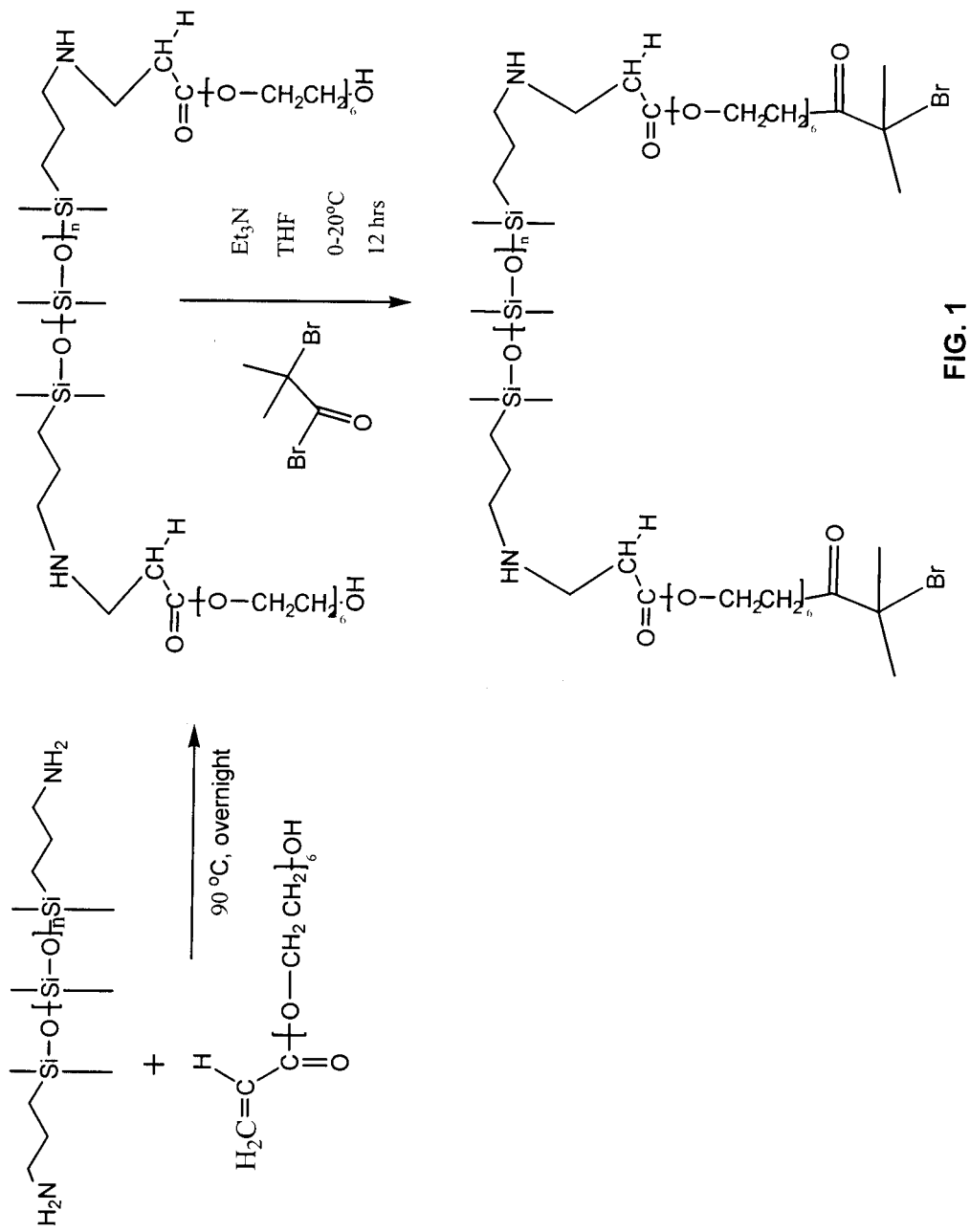
FIG. 1 depicts the reaction scheme for (a) Michael Addition of APT-PDMS and Polyethyleneglycol Monoacrylate at 90° C. and (b) the Macroinitiator synthesis of PDMS-PEA6-OH with 2-bromoisobutyryl bromide in THF at 0-20° C.

It is the objective of the present invention to prepare a curable polyurethane coating which incorporates the zwitterionic/amphiphilic pentablock copolymer in the coating composition. The cured coating has good fouling-release properties coupled with protein resistance properties. In general, these coatings are suitable for any application where anti-adherent properties are desirable. In particular, the coatings of the present invention are suitable for marine coatings where ease of application, long-term durability, and high release for all marine organisms is desired. It has been discovered that by chemically bonding the protein resistant polymers to the low surface energy PDMS component, the PDMS component stratifies to the coating surface, bringing the chemically bound protein resistant polymers to the surface as well. Thus, the coating does not have hydrophilic polymer segments distributed throughout the bulk. Instead, they are concentrated on the surface. Alternatively, the PDMS and either PEO or poly(SBMA) components may phase separate on the surface of the coating resulting in a coating having a surface which has fouling-resistant properties.

The zwitterionic/amphiphilic pentablock copolymer of the present invention was prepared via a multi-step synthetic method. An amphiphiliic macroinitiator was synthesized via the Michael addition reaction of aminopropyl terminated poly(dimethylsiloxane) (APT-PDMS) and a monoacrylate terminated polyethylene glycol (Bisomer PEA6) to yield a polyethyleneglycol monohydroxy terminated PDMS intermediate (PDMS-PEO-OH). The PDMS-PEO-OH intermediate was reacted with 2-bromoisobutyryl bromide to yield a bromine-terminated macroinitator (PDMS-PEO-Br).

The aminopropyl terminated poly(dimethylsiloxane) (APT-PDMS) used in the reaction can be readily synthesized and are also commercially available from Gelest, Inc. and preferably have number average molecular weights of 875 and 3000. However, number average molecular weights ranging from about 200 to about 50,000 are also suitable for the present invention.

The preferred monoacrylate terminated polyethylene glycol (Bisomer PEA6) is commercially available from Cognis. However, other mono-acrylate and mono-methacrylate terminated polyethylene glycols known to those of ordinary skill in the art are also suitable for use in this invention. The number of repeating units of the PEO ranges from 1 to 300. For use in the synthesis of the macroinitiator for ATRP, the terminal end of the PEO must be a hydroxyl group.

In the second step of the synthesis reaction, the bromine-terminated macroinitiator (PDMS-PEO-Br) was reacted with [2-(Methacryloyloxy)ethyl]dimethyl-(3-sulfopropyl)ammonium hydroxide (SBMA 97%) (commercially available from Aldrich) in the presence of methanol (MeOH 98%) (degassed prior to use) (commercially available from VWR), Alloy 102 copper beads (commercially available from McMaster-Carr), and a 2,2'-bipyridine (Bpy>99%) solution (commercially available from Aldrich). The resulting product is a zwitterionic/amphiphilic pentablock copolymer.

A curable crosslinked polyurethane coating system was prepared by mixing the zwitterionic/amphiphilic pentablock copolymer with an acrylic polyol (80% butyl acrylate, 20% 2-hydroxyethyl acrylate prepared by solution polymerization) and an aliphatic isocyanate (Tolonate IDT 70B, a triisocyanurate resin from isophorone diisocyanate, commercially available from Rhodia) and casting the coating formulation on a substrate and effecting curing. In general, the zwitterionic/pentablock copolymer is used in the coating at an amount ranging from about 1 to about 50 percent by weight. Preferably, the amount ranges from about 1 to about 15 percent by weight. Any polyol is suitable in the coating formulation including polyester, polyether, polycarbonate, and acrylic polyols. Any polyisocyanate is used in the formation of the polyurethane coating including aromatic, cycloaliphatic and aliphatic isocyanates. Aliphatic and cycloaliphatic isocyanates are preferred. These include the isocyanurate and biuret trimer resins of 1,6-hexamethylene diisocyanate and isophorone diisocyanate. Solvents are also used in the coating formulation. Aliphatic or aromatic, ketones, alcohol, and ester solvents are suitable for use. Dipolar aprotic solvents such as N,N-dimethyl formamide, N,N-dimethyl acetamide, and N-methylpyrrolidone can be used. A mixture of solvents is also suitable for use in the invention. In addition, a catalyst may also be used in the coating formulation to catalyze the curing reaction. Typical catalysts include tin catalysts such as dibutyl tin dilaurate, dibutyl tin diacetate (DBTDAc) and amine catalysts such as DABCO [1,4-diazabicyclo[2.2.2]octane]. A pot life extender can also be used in the coating formulation to slow down the curing reaction until the coating is applied to the substrate. A typical pot life extender is 2,4-pentanedione.

EXAMPLES

Example 1

Aminopropyl terminated polydimethylsiloxane (APT-PDMS) with number average molecular weights of 875 and 3000 were purchased from Gelest, Inc. and used as received. Polyethyleneglycol monoacrylate (Bisomer PEA6) was obtained from Cognis and used as received. [2-(Methacryloyloxy)ethyl]dimethyl-(3-sulfopropyl)ammonium hydroxide (SBMA 97%), 2-Bromoisobutyryl bromide, 2,2'-bipyridine (Bpy>99%) and triethylamine were purchased from Aldrich and used as received. Tetrahydrofuran (THF, 99.8%) was purchased from VWR and used as received. Methanol (MeOH 98%) was obtained from VWR and degassed prior to reaction.

Synthesis of PDMS-PEA6 Macroinitiator [PDMS-PEA6-Br].

FIG. 1. (a) Illustrates the Michael addition of APT-PDMS and polyethyleneglycol monoacrylate. The typical protocol for the macroinitiator synthesis was as follows. APT-PDMS and Bisomer PEA6 (1:2 molar ratio) where weighed out and dispensed into a 20 mL glass vial, capped, heated to 90° and stirred via magnetic stirring overnight. The reaction product was characterized by $^1$H NMR (400 MHz, CDCl$_3$) to confirm the completion of the reaction with the disappearance of the 1-ethylene peaks. PDMS-PEA6-OH macroinitiator (PDMS-PEA6-Br) was synthesized by reacting the polyethyleneglycol monohydroxy terminated PDMS with 2-bromoisobutyryl bromide in THF. The product was purified by extraction with 1% NaCl and H$_2$O three times and dried in a vacuum oven overnight. The dried product was characterized by FTIR and the absence of the —OH band confirms the completion of the macroinitiator (PDMS-PEA6-Br) synthesis.

Synthesis of Zwitterionic/Amphiphilic Copolymer.

A typical protocol for the ATRP synthesis of the zwitterionic/amphiphilic copolymer using PDMS-PEA6-Br initiator was as follows. The PDMS-PEA6-Br initiator (2.46 g, 0.8 mmol), SBMA (4 g, 0.8 mmol, target $DP_n=18$) and methanol (7500 μL) were added to a 4 oz. glass jar. The mixture was stirred for 5 minutes with a magnetic stir bar to allow for the initiator to go into solution. 4 Cu beads were then added to the jar and the Bpy solution (0.6247 g in 25 mL MeOH) was dispensed into the jar.

The polymerization was performed at room temperature for 16 h. After polymerization, the product was washed with MeOH to remove any residual monomer and rotovapped and placed in the vacuum oven overnight to remove any remaining MeOH. The final product was characterized by $^1$H NMR (400 MHz, D$_2$O). NMR peak assignments (ppm): 0.1, CH3, —Si(C)C, 1.85, CH2, —S(=O)(=O), Np (C) C, 1.9, CFI, —C(=O)OR; 2.65, CH2, —S(=O)(=O), —C, 2.7, CH3, —Np(C)C, 2.8, NH; CH$_2$, —O—C. Copolymers were also synthesized using the catalyst CuBr instead of the copper beads. The product was also characterized using FTIR. Key absorbances are observed at (cm$^{-1}$): 3447, NH; 2974, CH; 1727, C=O; 1182, Si—O; 1040, SO$_3$—, and 963, C—O, indicative of the groups expected to be present in the final pentablock copolymer.

The polymerization conditions for the ATRP synthesis are described in Table 1.

TABLE 1

Polymerization Conditions for Atom Transfer Radical Polymerization of Zwitterionic/Amphiphilic Penta-block Copolymer.

|  | A-11 Cu Bead | A-11 Cu Bead | A-11 Cu Bead | A-11 Cu Bead | A-15 Cu Bead | A-15 Cu Bead | A-11 CuBr | A-15 CuBr |
|---|---|---|---|---|---|---|---|---|
| SBMA, g | 2 | 2 | 4 | 4 | 4 | 4 | 4 | 4 |
| A-11 Macro-initiator, g | 0.62 | 0.64 | 2.475 | 2.41 | 0 | 0 | 2.41 | 0 |
| A-15 Macro-initiator, g | 0 | 0 | 0 | 0 | 5.88 | 5.88 | 0 | 5.88 |
| No. of Cu Beads | 1 | 1 | 4 | 4 | 4 | 4 | 0 | 0 |

TABLE 1-continued

Polymerization Conditions for Atom Transfer Radical Polymerization of Zwitterionic/Amphiphilic Penta-block Copolymer.

|  | A-11 Cu Bead | A-11 Cu Bead | A-11 Cu Bead | A-11 Cu Bead | A-15 Cu Bead | A-15 Cu Bead | A-11 CuBr | A-15 CuBr |
|---|---|---|---|---|---|---|---|---|
| CuBr-Bpy, mL | 0 | 0 | 0 | 0 | 0 | 0 | 10 | 10 |
| Bpy, mL | 10 | 10 | 10 | 10 | 10 | 10 | 0 | 0 |
| MeOH, mL | 30 | 30 | 30 | 30 | 30 | 30 | 30 | 30 |
| Total, mL | 40 | 40 | 40 | 40 | 40 | 40 | 40 | 40 |

In Table 1, the A-11 Cu Bead (columns 1-4) and the A-15 Cu Bead (columns 5 and 6) are repeated polymerizations of the same pentablock copolymers. These pentablock copolymers were combined for the coating formulations due to the amount of pentablock copolymer that was needed per formulation.

The first two columns of Table 1 (A-11 Cu Bead) were the initial ATRP polymerizations using Cu beads, after the successful initial polymerizations, the respective ATRP polymerizations were done on a larger scale to allow for more product which in turn would allow for larger coating formulations.

A schematic representation of the copolymer structure is shown in FIG. 2. The illustration depicts the reaction sites for the Michael addition as well as the ATRP synthesis. Three different shapes represent the three components of the pentablock copolymer. The shapes are triangle, square, and circle for poly(SBMA), PEO, and PDMS, respectively.

Solutions of the zwitterionic/amphiphilic pentablock copolymers were prepared by weighing the polymer and the appropriate amounts of solvent into glass 20 mL vials (Table 2). The mixtures were allowed to stir overnight at 45° C. and continued stirring until needed for formulation.

TABLE 2

Solutions of zwitterionic/amphiphilic pentablock copolymers

|  | A-15 Cu Bead | A-15 CuBr | A-11 Cu Bead | A-11 CuBr |
|---|---|---|---|---|
| Pentablock Copolymer, g | 0.7 | 0.7 | 2.42 | 2.42 |
| Toluene, mL | 4.15 | 4.15 | 2.86 | 2.86 |
| NMP, mL | 0.83 | 0.83 | 0.6 | 0.6 |

Example 2

Polyurethane coating formulations containing the zwitterionic/amphiphilic pentablock copolymers of Example 1 were prepared as listed in Table 3. A control formulation not containing a pentablock copolymer was prepared and is labeled "acrylic-urethane." The polyurethane coatings were formulated by first adding the non-reactive compounds into a glass 20 mL vial. The non-reactive components consist of the acrylic polyol, 2,4-pentanedione, and zwitterionic/amphiphilic penta-block copolymer-solvent mixture. The non-reactive components were stirred by magnetic stirring for 30 minutes at room temperature. The reactive components (isocyanate and DBTDAc) were added to the 20 mL vial and stirred for 30 minutes. An additional hour was allowed for the viscosity to build for drawdowns.

TABLE 3

Zwitterionic/Amphiphilic Penta-block Copolymer-polyurethane Coatings Formulations

|  | 1 A-15 Cu Bead | 2 A-15 CuBr | 3 A-11 Cu Bead | 4 A-11 CuBr | 5 Acrylic-urethane |
|---|---|---|---|---|---|
| Acrylic Polyol (20% HEA, 80% BA), mL | 1.8 | 1.8 | 3.5 | 3.5 | 8.75 |
| XIDT 70B, mL | 2.2 | 2.2 | 1.5 | 1.5 | 3.75 |
| DBTDAc (0.001% in MAK), mL | 0.2 | 0.2 | 0.2 | 0.2 | 0.25 |
| Pentablock Copolymer-solvent, mL | 5.68 | 5.68 | 5.88 | 5.88 | 0 |
| 2,4-Pentanedione | 0.75 | 0.75 | 0.75 | 0.75 | 1.875 |

The formulations were then applied via drawndown on aluminum panels and aluminum panels with epoxy primed surface at a wet thickness of 8 mils. The formulations were also applied to glass panels to provide free films for further characterization. The coatings were allowed to cure at ambient conditions overnight in drying racks. After the overnight cure, the panels were placed in an oven at 80° C. for one hour, then placed back into the drying racks until needed for further testing and characterization.

Figure 3:
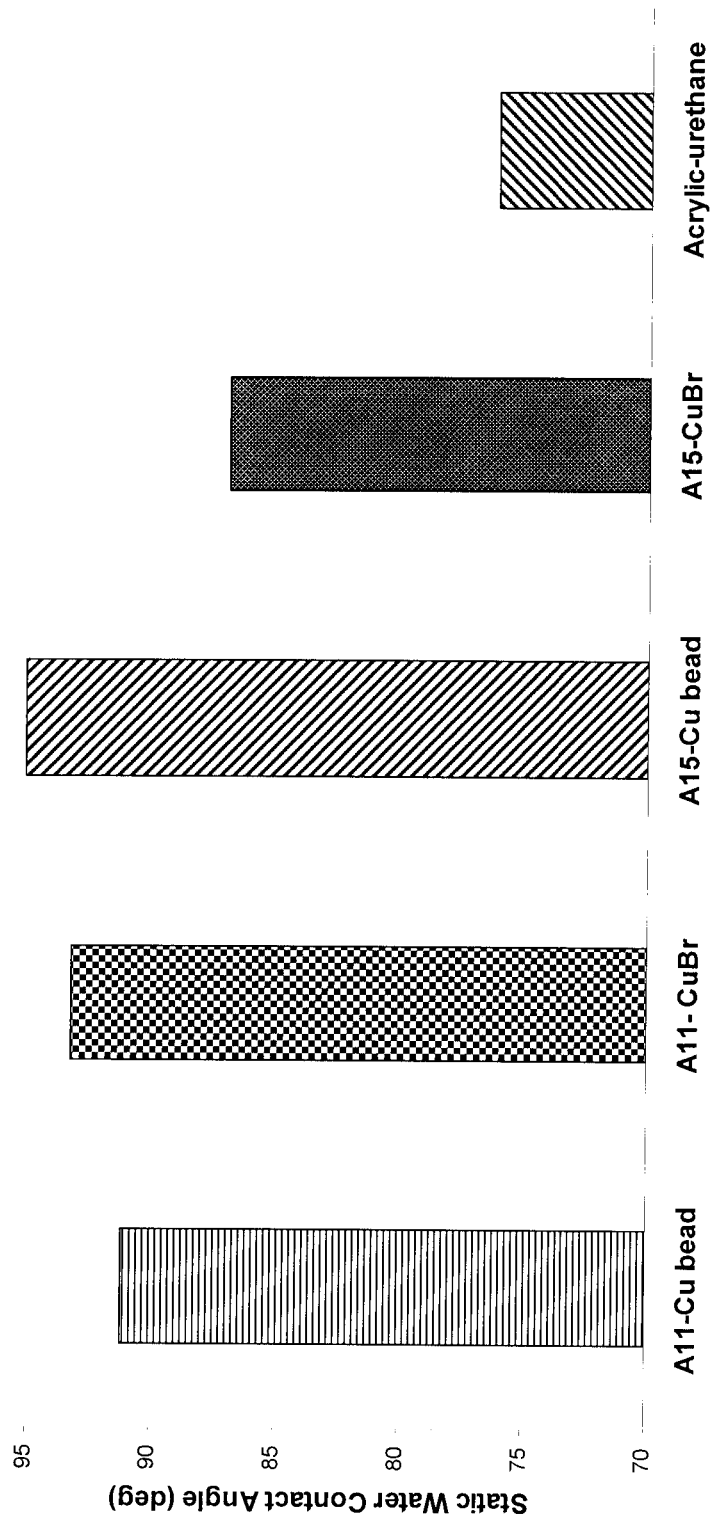
FIG. 3 shows the static water contact angle for polyurethane coatings containing zwitterionic/amphiphilic pentablock copolymers and an acrylic-urethane control.

The coatings were characterized using static water contact angle measurements. As shown in FIG. 3, most of the pentablock copolymer polyurethane coatings show a hydrophobic nature, that being a water contact angle higher then 90°. The high water contact angle value tends to indicate that the surface is enriched in PDMS. The water contact angle values for all of the pentablock-containing polyurethanes is higher than the control polyurethane, indicating that the surface composition has been modified by the incorporation of the pentablock copolymers.

Figure 4:
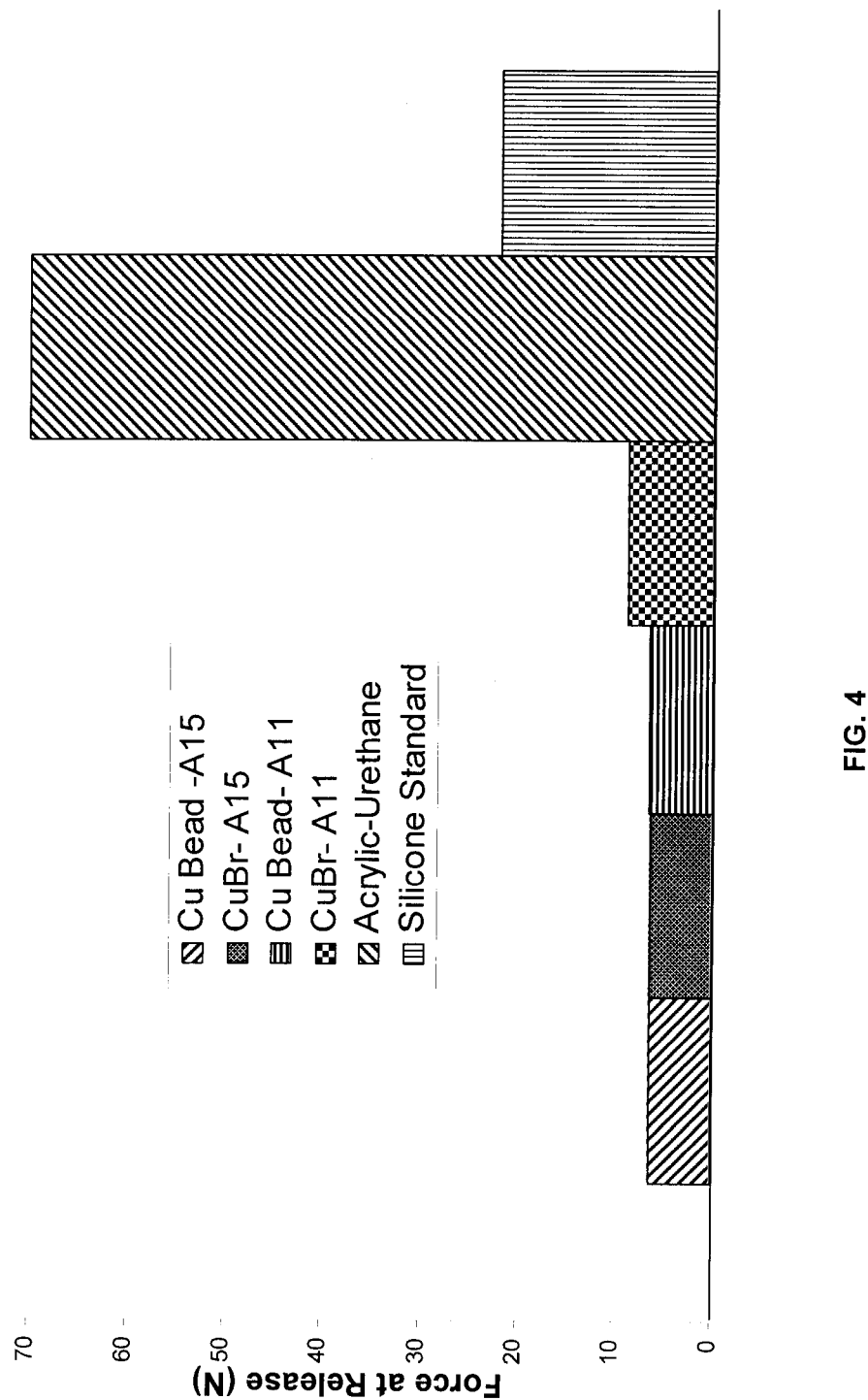
FIG. 4. Shows the pseudobarnacle adhesion for polyurethane coatings containing awitterionic/amphiphilic pentablock copolymers, acrylic-urethane control and silicone elastomer (DC 3140) standard.

The coatings were also subjected to the pseudobarnacle adhesion test (Bret J. Chisholm, Dean C. Webster, James W. Bennett, Melissa Berry, David A. Christianson, Jongsoo Kim, Bret Mayo, Nathan J. Gubbins, "Combinatorial Materials Research Applied to the Development of New Surface Coatings VII: An Automated System for Adhesion Testing," Rev. Sci. Instr., 78, 072213 (2007).) In this test a metal stud is glued to the surface of the coatings using an epoxy adhesive. After curing the force required to remove the stud from the surface is determined. FIG. 4 depicts that pseudobarnacle adhesion for polyurethane coatings containing zwitterionic/amphiphilic pentablock copolymers, acrylic-polyurethane control and silicone elastomer (DC3140) standard. The pentablock copolymer-containing polyurethane coatings all showed a lower force of release when compared to the control acrylic-urethane demonstrating that incorporation of the pentablock copolymer leads to weak adhesion at the surface of the coatings. The pseudobarnacle adhesion is also lower than a silicone elastomer control coating, which is a standard type of fouling-release coating.

Figure 5:
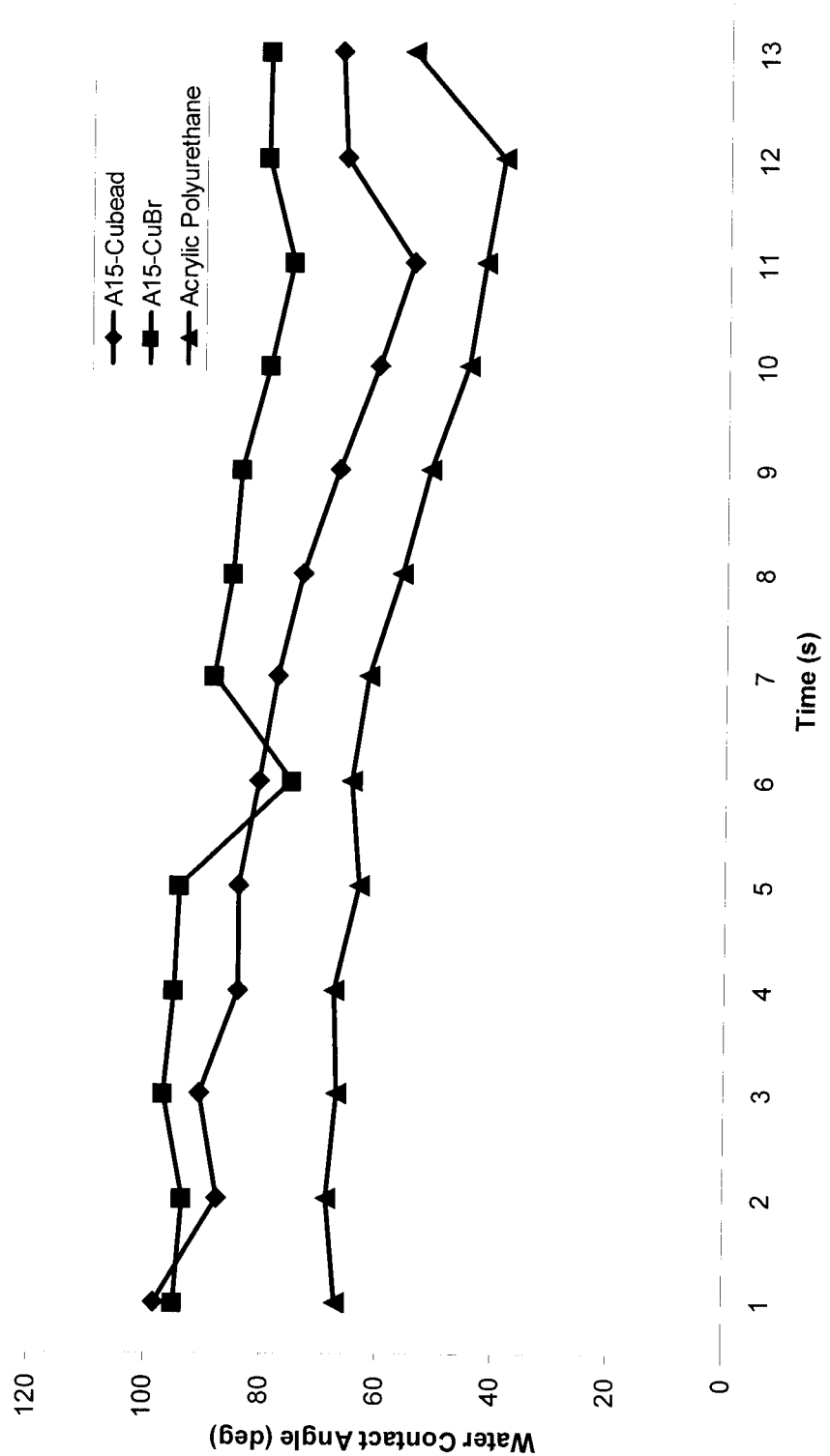
FIG. 5 shows the dynamic water contact angle of pentablock copolymer polyurethane coatings and acrylic polyurethane.

FIG. 5 shows the dynamic water contact angle of pentablock copolymer polyurethane coatings and acrylic polyurethane. The data indicates that the water contact angle of the pentablock copolymer-containing polyurethane coatings begins at a high value, indicating that the coating initially is hydrophobic as a result of the stratification of the pentablock containing PDMS to the coating surface. The contact angle decreases during the experiment indicating that the hydrophilic components of the pentablock copolymer are migrating to the surface as result of being in contact with the water droplet. Thus, the polyurethane coating demonstrates surface amphiphilic behavior.

Example 3

The zwitterionic/amphiphilic polyurethane coatings were subjected to a series of laboratory assays designed to determine their non-fouling and fouling-release properties.

A series of additional control coatings were utilized in this study to gauge performance of experimental coatings. The control coatings are as follows:

Intersleek 700 (commercial fouling-release coating manufactured by International Paint) is represented as "700" in the figures.

Intersleek 900 (commercial fouling-release coating manufactured by International Paint) is represented as "900" in the figures. Silastic T-2 (commercial silicone elastomer manufactured by Dow Corning) is represented as "T2" in the figures.

Polyurethane made from polycaprolactone and a polyisocyanate is represented as "PU" in the figures.

Illustrated in Table 3 (Example 2) are the zwitterionic/amphiphilic polyurethane coatings and the polyurethane control coating formulation abbreviated by the numbers on the bioassay graphs. Prior to conducting the assays, the coatings were preleached in deionized water for two weeks and four weeks, represented on the graphs by the addition of −2 or −4 to the coating designation, respectively.

Evaluation with the Marine Bacterium *Cellulophaga lytica*

Figure 6:
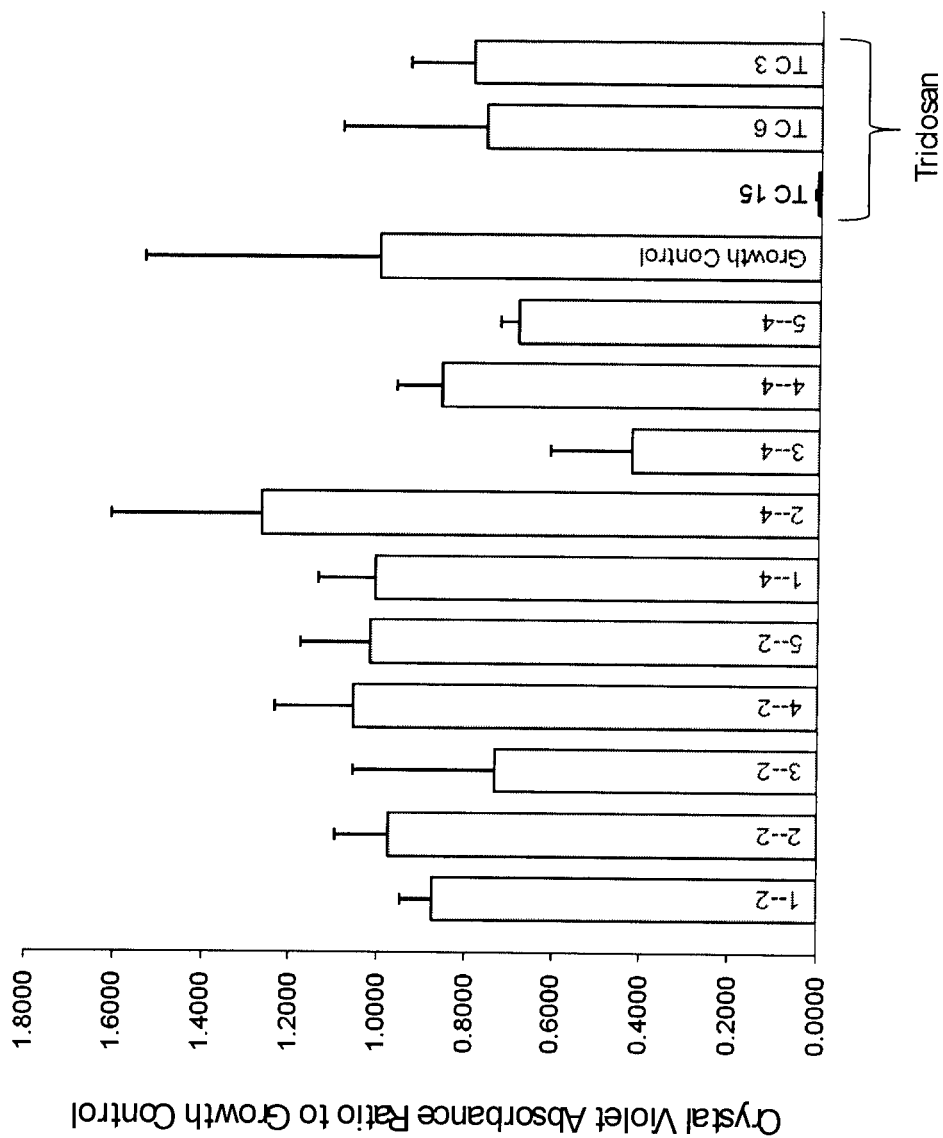
FIG. 6 depicts the Leachate toxicity using C. lytica of Zwitterionic/amphiphilic polyurethane coatings, polyurethane control, and triclosan controls.

Leachate toxicity was assessed by introducing the bacterium into overnight extracts (artificial sea water with nutrients) of each coating and evaluating growth after 24 hours via a crystal violet colorimetric assay (FIG. 6). Growth in coating leachates was reported as an absorbance ratio (600 nm) to a growth control. A series of negative growth controls (medium+bacteria+triclosan) was also included in the analysis. [TC15=triclosan 15 μg, TC6=6 μg, and TC3=3 μg.] Coating 3 showed leachate toxicity after two and four weeks of water immersion. Coating 5 showed some slight toxicity after four weeks of water immersion. The leachate toxicity observed is likely due to residual copper catalyst from the pentablock copolymer synthesis.

Figure 7:
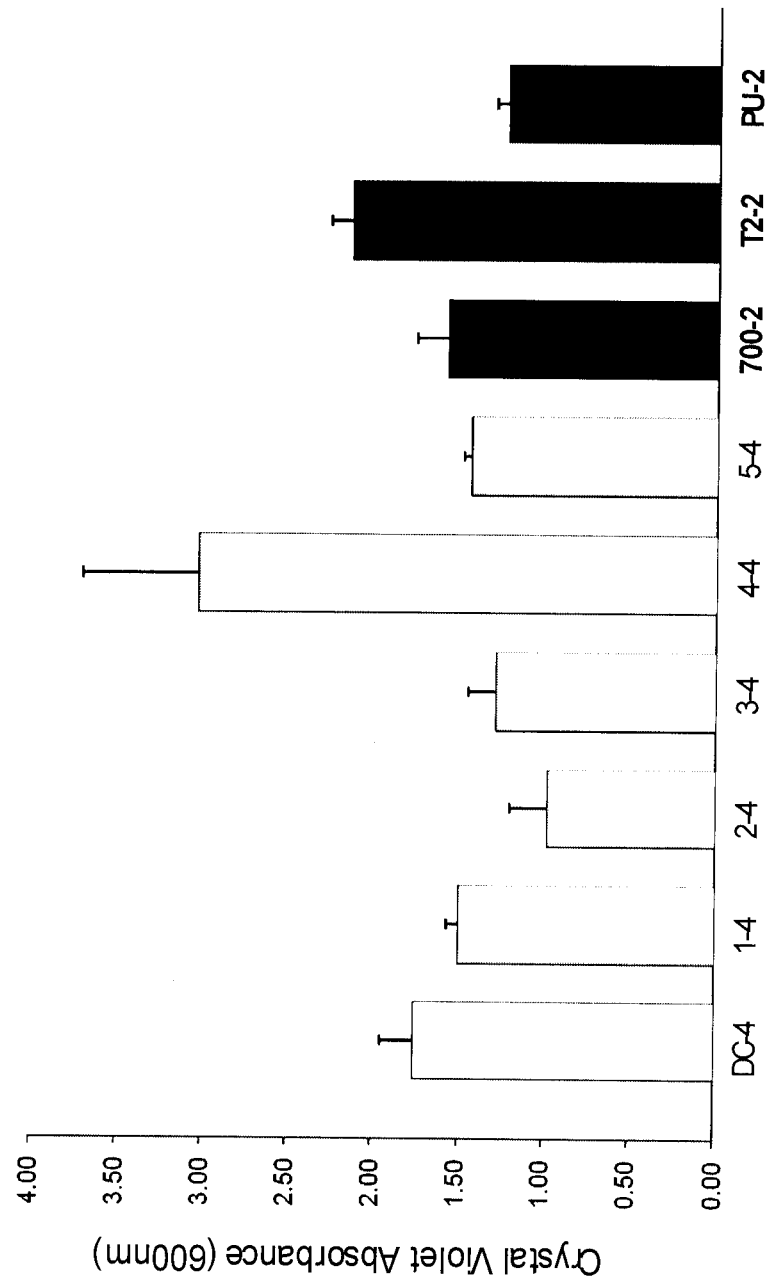
FIG. 7 depicts the C. lytica biofilm retention of Zwitterionic/amphiphilic polyurethane coatings, acrylic-polyurethane control, commercial fouling-release coatings, and silicone control coatings.

*Cellulophaga lytica* biofilm retention and retraction analysis was assessed by a crystal violet colorimetric assay. A 5% suspension of *C. lytica* in ASW+nutrients (~107 cells·ml-1) was prepared and 1 ml was added to each well of the coating plate. Plates were incubated statically at 28° C. for 24 hours to facilitate bacterial attachment and colonization. Plates were rinsed three times with DI water and stained with crystal violet. Images were taken after staining, and then the crystal violet was extracted in 33% acetic acid and the resulting eluates were measured for absorbance at 600 nm. Biofilm retention was reported as the mean absorbance value of three replicate samples. Error bars represent one standard deviation of the mean. The absorbance value reported is directly proportional to the amount of biofilm retained on the coatings' surfaces. As shown in FIG. 7, the results indicate that the amount of biofilm on the novel coatings is similar or slightly less than that on the control coatings.

Figure 8:
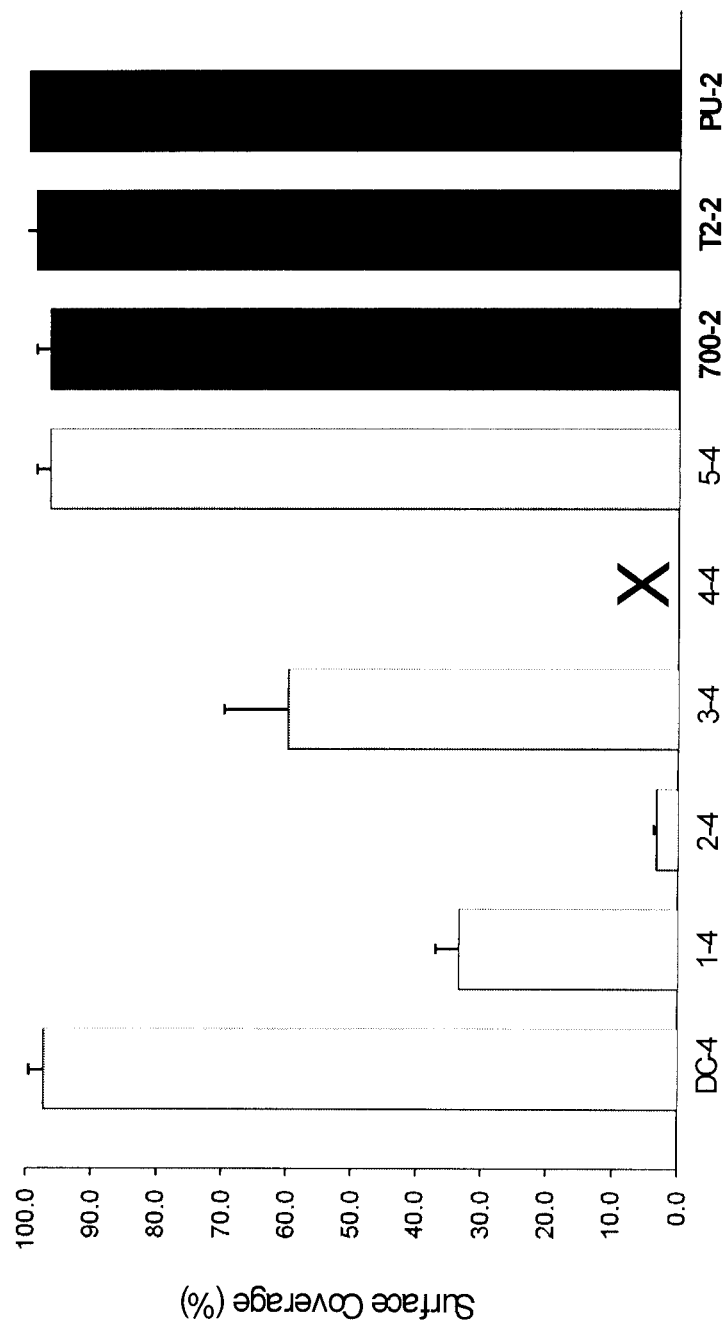
FIG. 8 depicts the bacterial biofilm retraction on zwitterionic/amphiphilic polyurethane coatings, acrylic-polyurethane control coating, commercial fouling-release coatings, and silicone standards.

Biofilm retraction is the spontaneous withdrawal of the biofilm from the surface of the coating. It was assessed by determining the percent coverage from digital images taken of each coating using an automated software tool. Biofilm retraction was reported as the mean percent coverage value of three replicate samples and is shown in FIG. 8. Error bars represent one standard deviation of the mean. Zwitterionic/amphiphilic polyurethane formulation 4 could not be analyzed due to crystal violet staining of the coating. The results indicate that the biofilm surface coverage is significantly less than that of the control coatings, indicating that the bacteria is not adherent to the novel coatings.

Evaluation with the Marine Bacterium *Halomonas pacifica*

Figure 9:
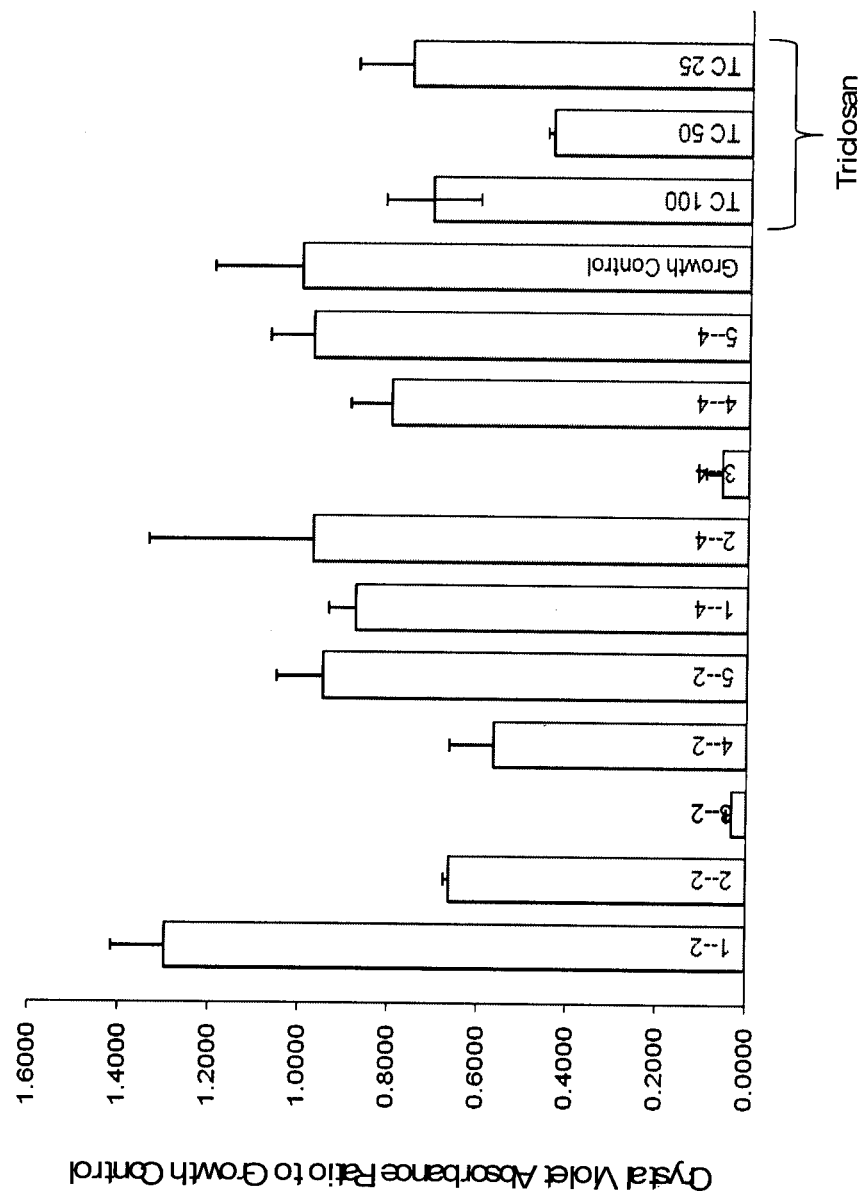
FIG. 9 depicts Leachate toxicity using H. pacifica of Zwitterionic/amphiphilic polyurethane coatings, polyurethane control and triclosan controls.

Leachate toxicity was assessed by introducing bacterium into overnight extracts (artificial sea water with nutrients) of each coating and evaluating growth after 24 hours via a crystal violet colorimetric assay (FIG. 9). Growth in coating leachates was reported as an absorbance ratio (600 nm) to a growth control. A negative growth control (medium+bacteria+triclosan) was also included in the analysis. Coatings 2, 3, and 4 showed leachate toxicity after two weeks of water immersion. Coating 3 showed leachate toxicity after four weeks of water immersion. As with the previous assay, the leachate toxicity is likely due to some residual copper catalyst from the pentablock copolymer synthesis.

Figure 10:
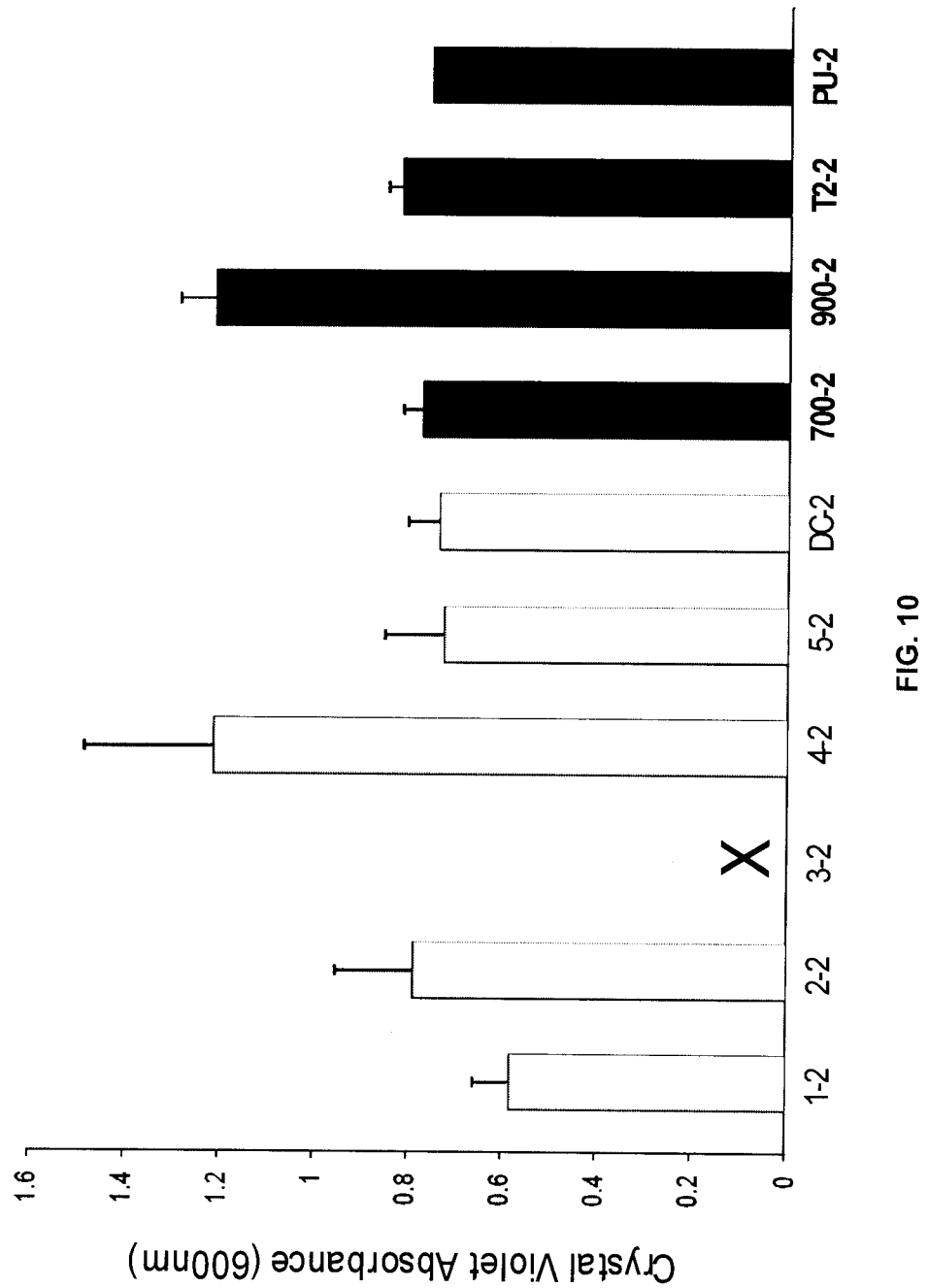
FIG. 10 depicts H. pacifica biofilm retention after two weeks of preleaching of Zwitterionic/amphiphilic polyurethane coatings, acrylic-polyurethane control, commercial fouling-release coatings, commercial fouling-release coatings, and silicone control coatings.
Figure 11:
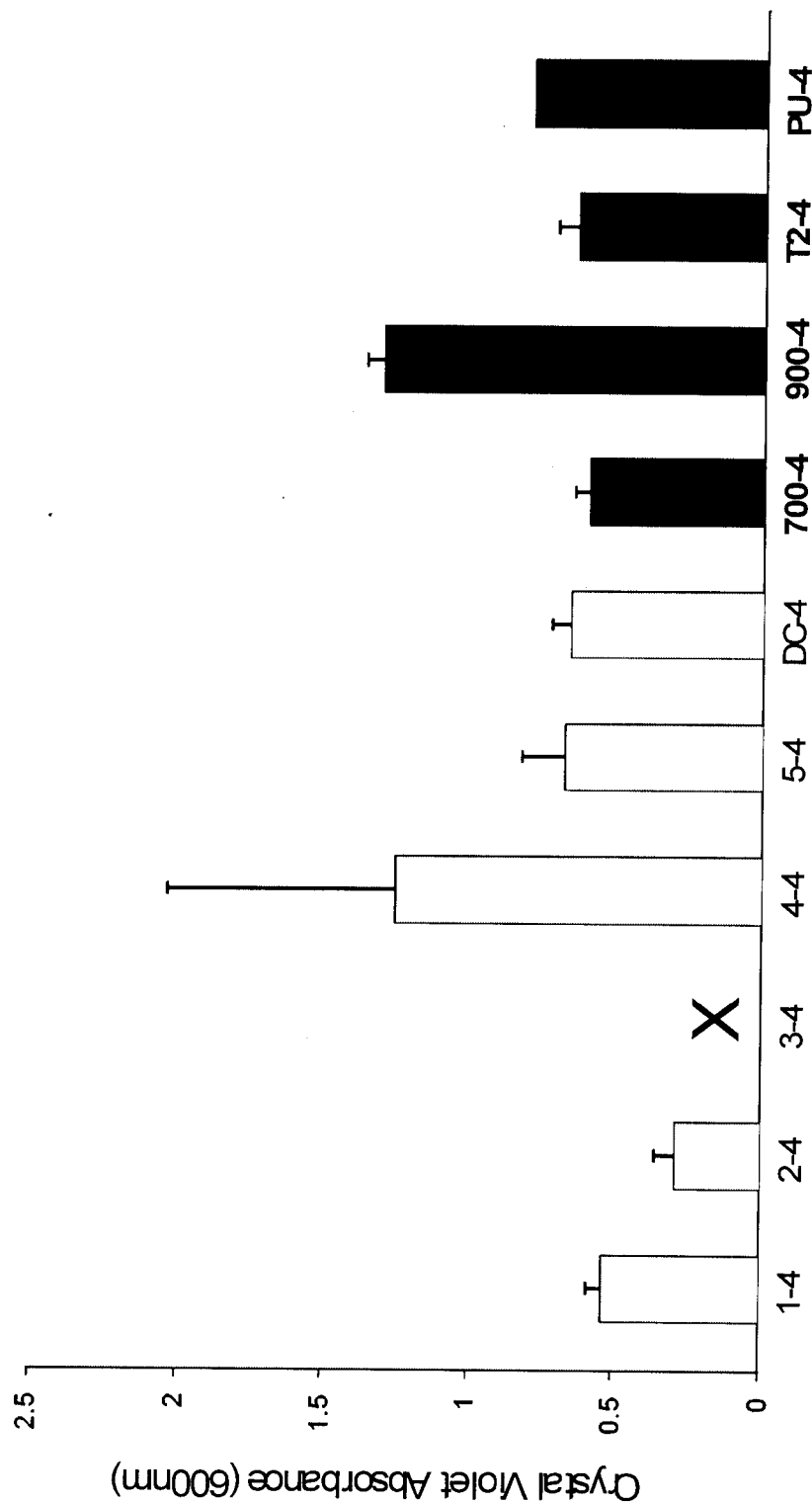
FIG. 11 depicts H. pacifica biofilm retention after four weeks of preleaching of Zwitterionic/amphiphilic polyurethane coatings, acrylic-polyurethane control, commercial fouling-release coatings, and silicone control coatings.

*H. pacifica* biofilm retention analysis was assessed by a crystal violet colorimetric assay. A 10% suspension of *H. pacifica* in ASW+nutrients (~108 cells·ml-1) was prepared and 1 ml was added to each well of the coating plate. Plates were incubated statically at 28° C. for 24 hours to facilitate bacterial attachment and colonization. Plates were rinsed three times with DI water and stained with crystal violet. Images were taken after staining, and then the crystal violet was extracted in 33% acetic acid and the resulting eluates were measured for absorbance at 600 nm. Biofilm retention was reported as the average crystal violet absorbance value of three replicate samples. Error bars represent one standard deviation of the mean. The absorbance value reported is directly proportional to the amount of biofilm retained on the coatings surfaces. As can be seen in FIG. 10, with the exception of coating 4, the biofilm retention is similar for the novel coatings to that of the control coatings. In FIG. 11, after four weeks of preleaching, coatings 1 and 2 have lower biofilm retention than the control coatings, indicating non-fouling behavior.

Figure 12:
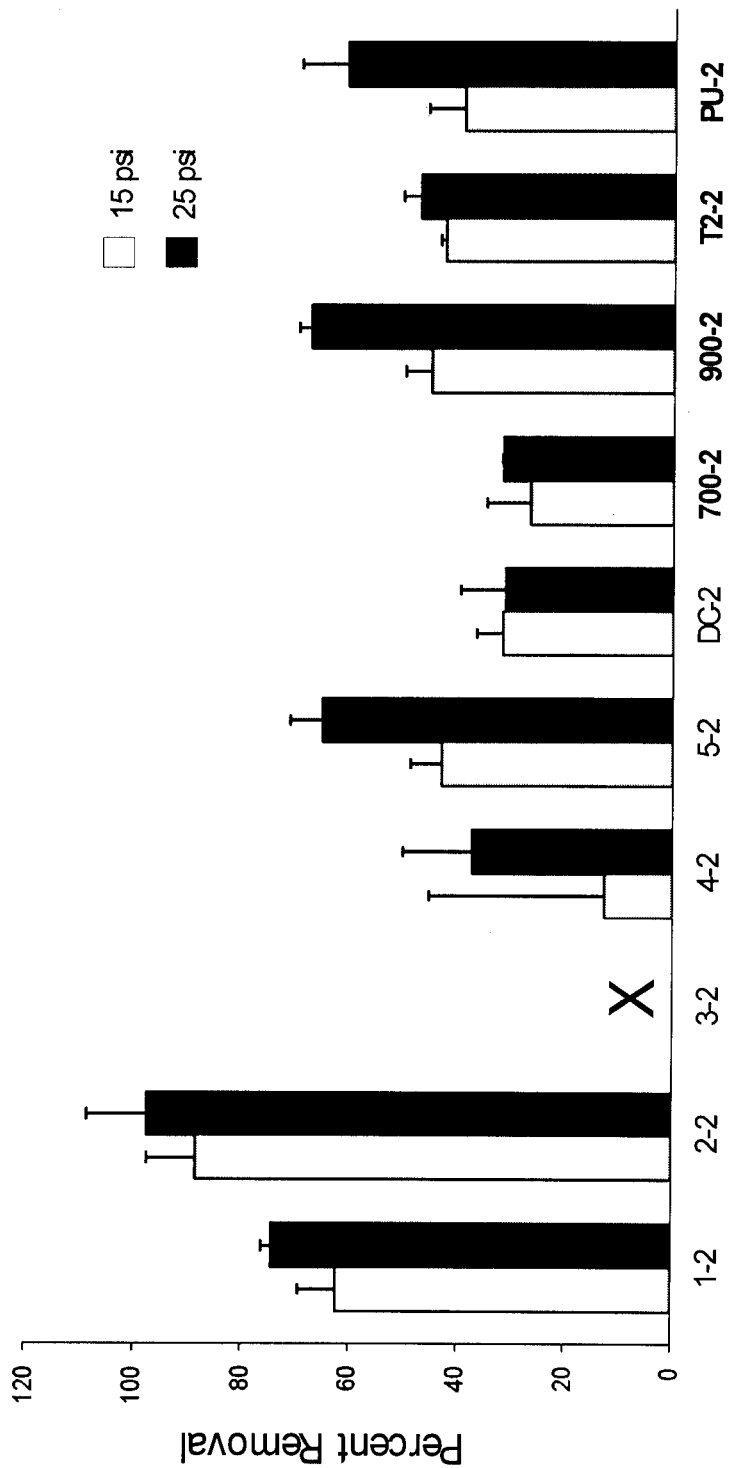
FIG. 12 depicts H. pacifica biofilm adhesion after two weeks of preleaching of Zwitterionic/amphiphilic polyurethane coatings, acrylic-polyurethane control, commercial fouling-release coatings, and silicone control coatings using water jet at 15 psi and 25 psi.
Figure 13:
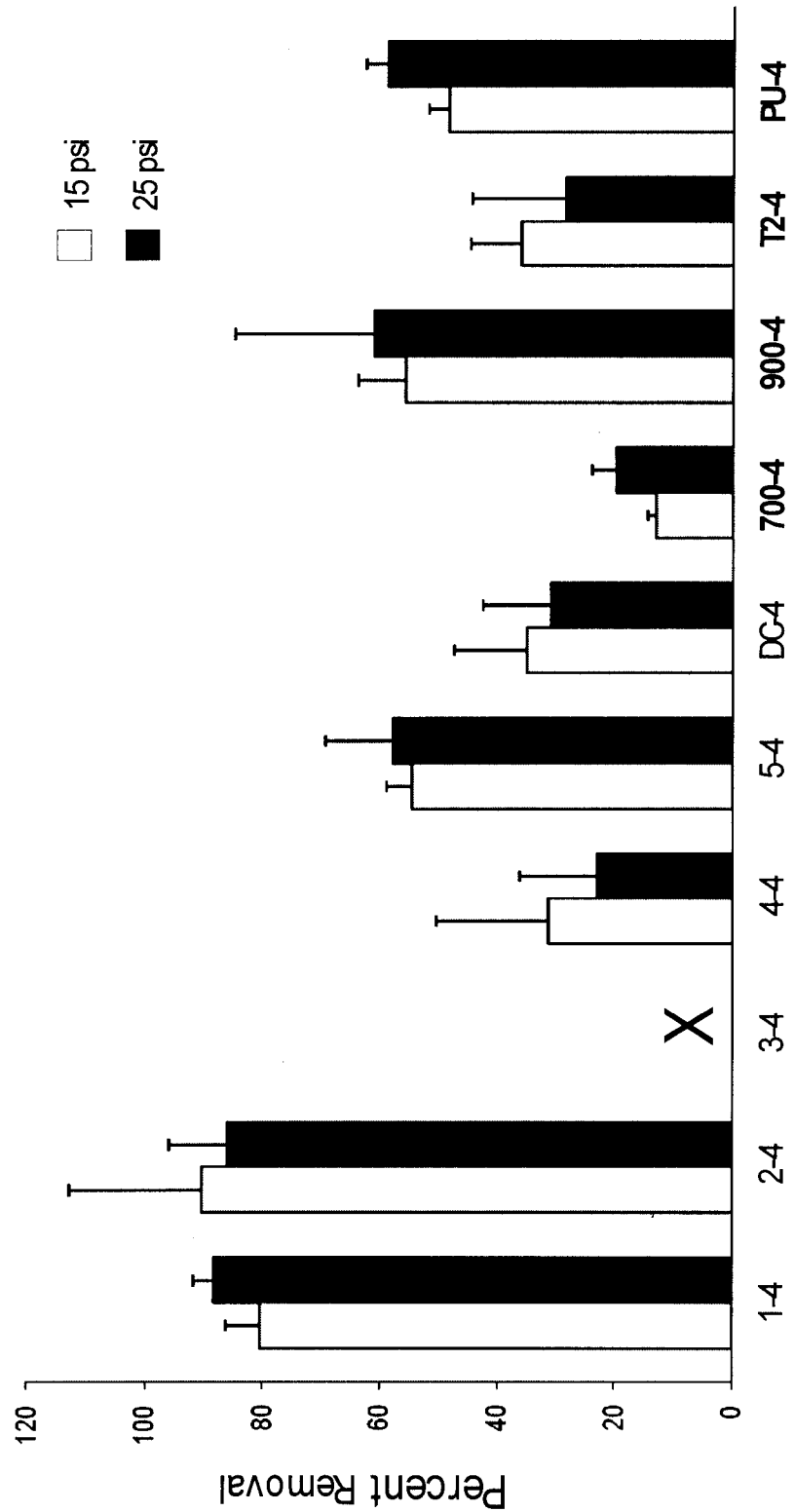
FIG. 13 depicts H. pacifica biofilm adhesion after four weeks of preleaching of Zwitterionic/amphiphilic polyurethane coatings, acrylic-polyurethane control, commercial fouling-release coatings and silicone control coatings using water jet at 15 psi and 25 psi.

Water jet adhesion was carried out after 24 hrs of bacterial biofilm growth. Biofilm adhesion is reported as the percent removal for each pressure indicated above. Error bars represent one standard deviation of the mean. Coating 3 could not be analyzed due to crystal violet staining of the coating surface. It can be seen in FIGS. 12 and 13 that the bioflim could be more easily removed from coatings 1 and 2 than the control coatings, indicating that the biofilm adhesion was lower on these coatings.

Evaluation with the Marine Microalgae *Navicula incerta*

Figure 14:
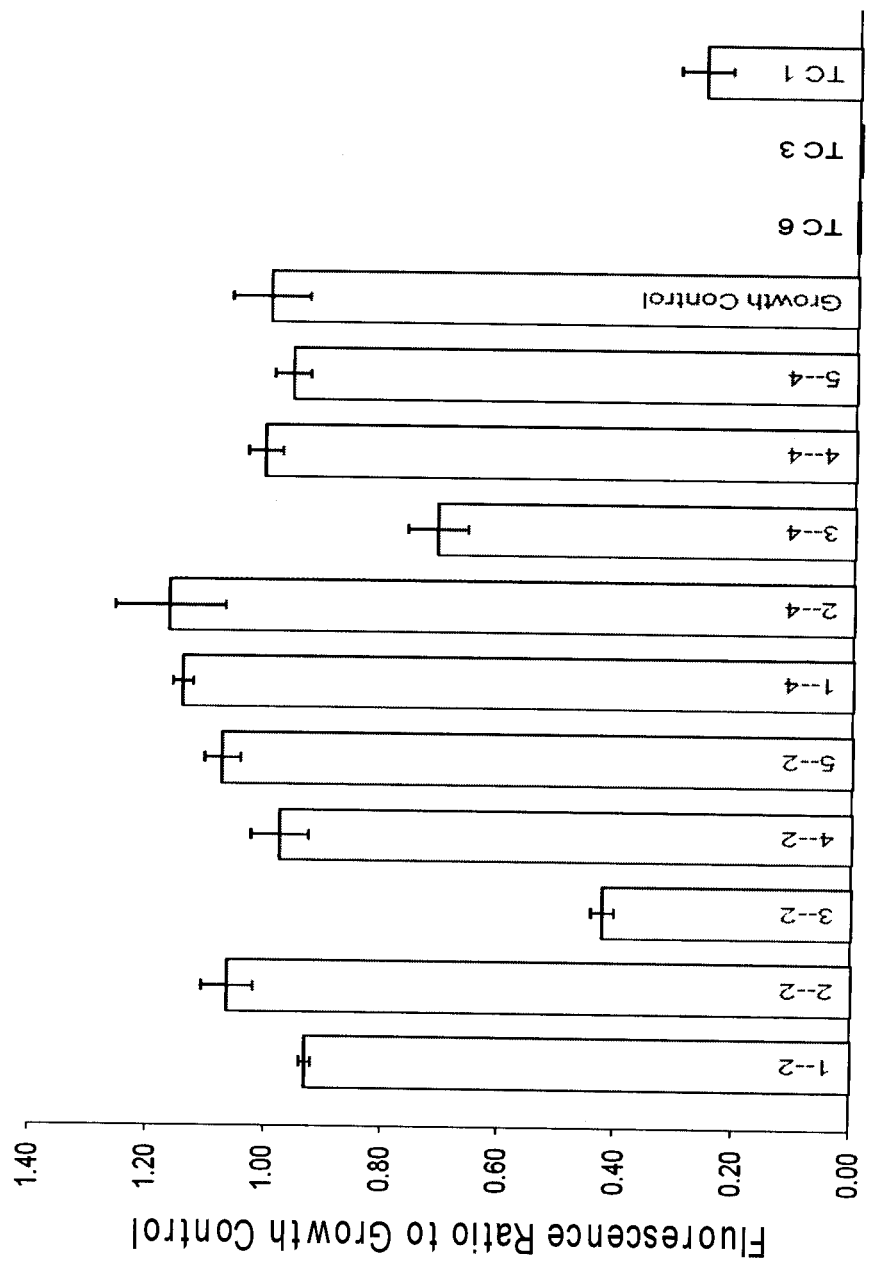
FIG. 14 depicts Leachate toxicity using N. incerta of Zwitterionic/amphiphilic polyurethane coatings, polyurethane control and triclosan controls.

Algal analysis was carried out after an overnight pre-equilibration in artificial sea water. Leachate toxicity was assessed by introducing algae into overnight extracts (artificial sea water with nutrients) of each polymer and evaluating growth after 48 hours via fluorescence of chlorophyll. Growth in polymer leachates was reported as a fluorescence ratio to a growth control. A series of negative growth controls (medium+bacteria+triclosan) was also included in the analysis. Coating 3 was leachate toxic after two and four weeks of preleaching (FIG. 14).

Figure 15:
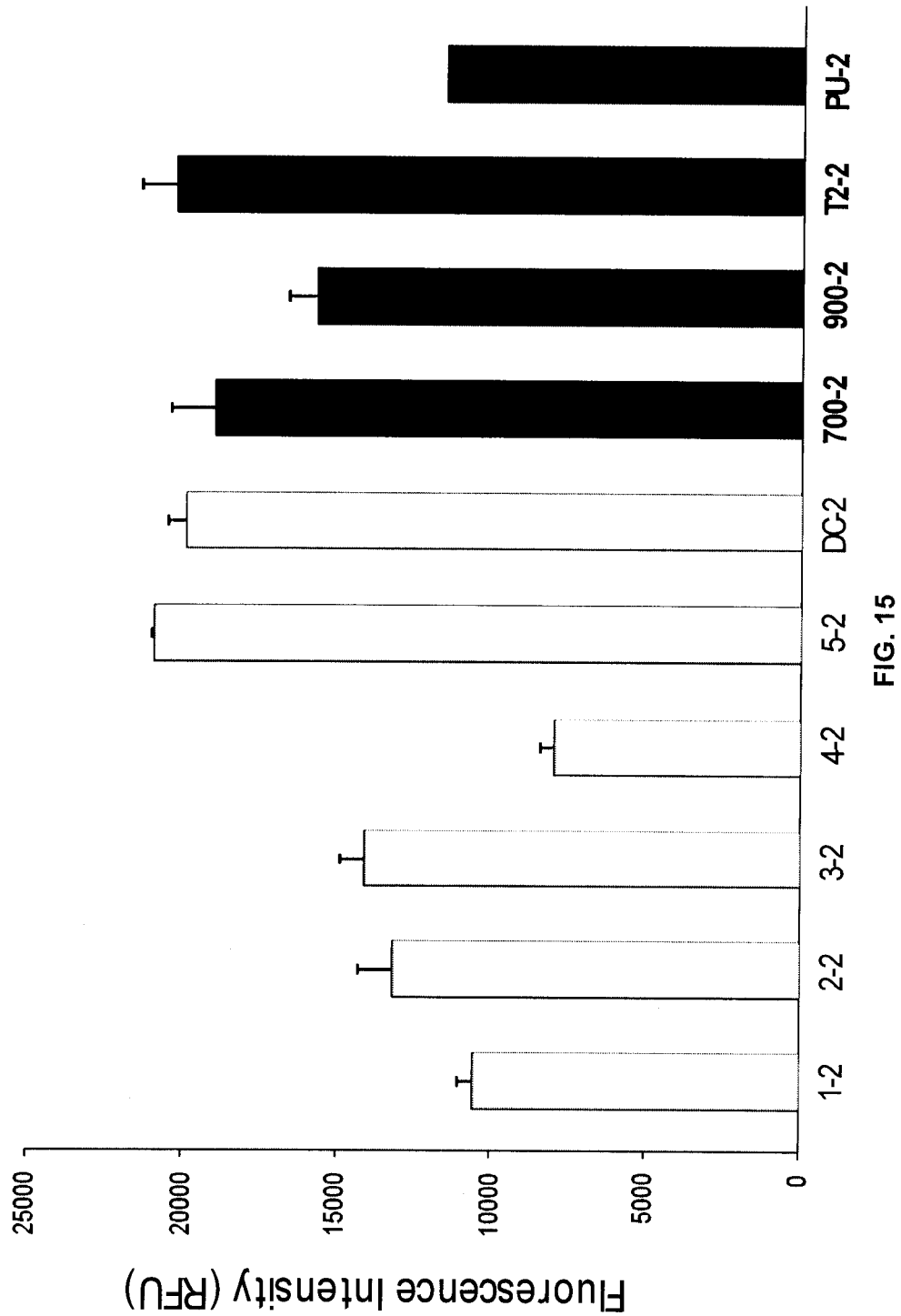
FIG. 15 depicts N. incerta cell attachment after two weeks of preleaching of Zwitterionic/amphiphilic polyurethane coatings, acrylic-polyurethane control, commercial fouling-release coatings and silicone control coatings.
Figure 16:
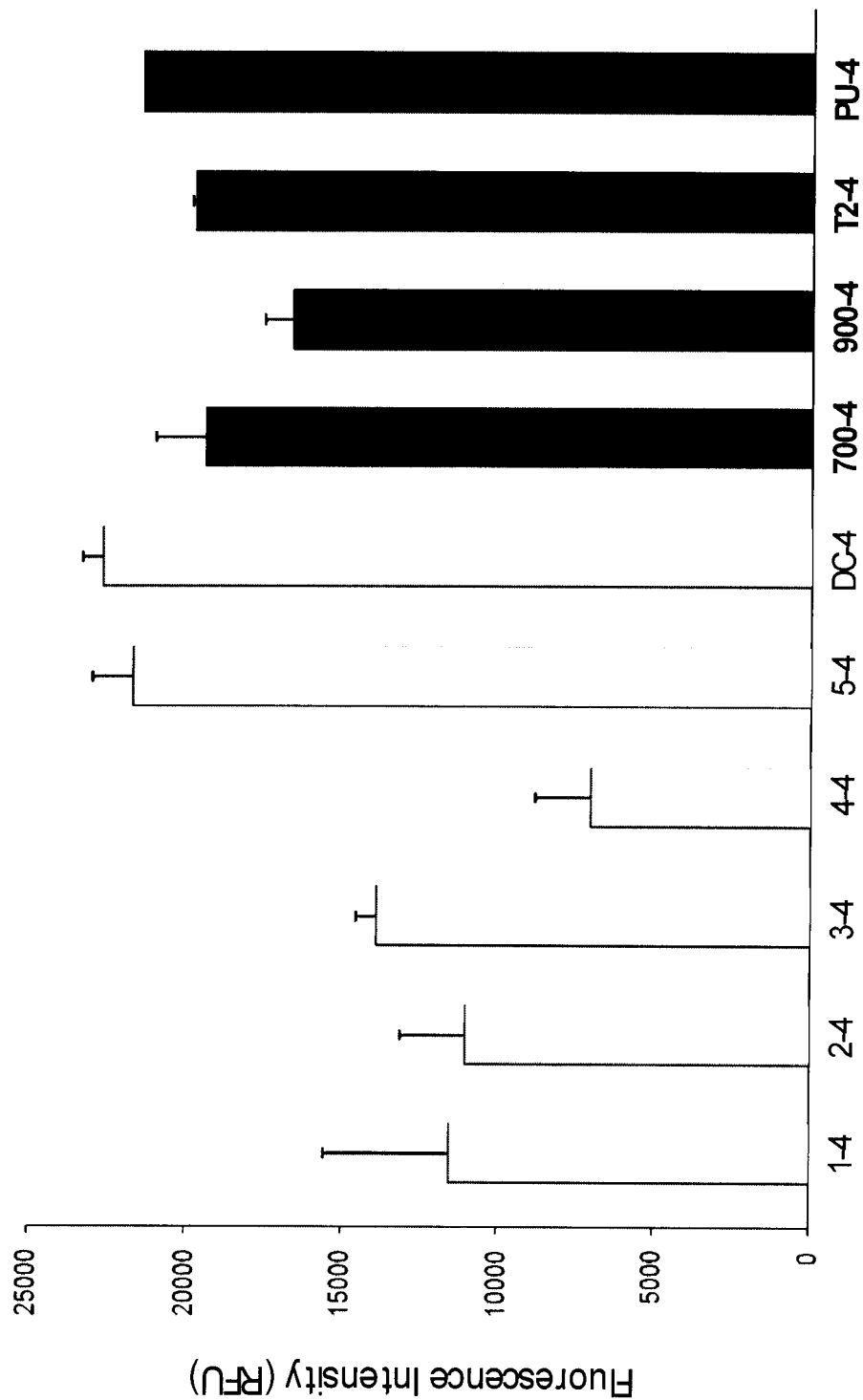
FIG. 16 depicts N. incerta cell attachment after four weeks of preleaching of Zwitterionic/amphiphilic polyurethane coatings, acrylic-polyurethane control, commercial fouling-release coatings and silicone control coatings.

For the assessment of biofilm growth, algae were diluted to an OD of 0.03 at 660 nm in artificial sea ASW supplemented with nutrients. 1 ml was added to each well of the plate and allowed to incubate statically for 48 hours. Algal biofilm growth was determined by fluorescence measurement of DMSO extracts. Biofilm growth was reported as fluorescence intensity (relative fluorescence units). Error bars represent one standard deviation of the mean. The absorbance value reported is directly proportional to the amount of cell attachment on the coatings surfaces. In FIGS. 15 and 16 it is seen that the attachment of *N. incerta* is lower for the novel coatings than the control coatings. This indicates that the novel coatings have non-fouling properties.

Figure 17:
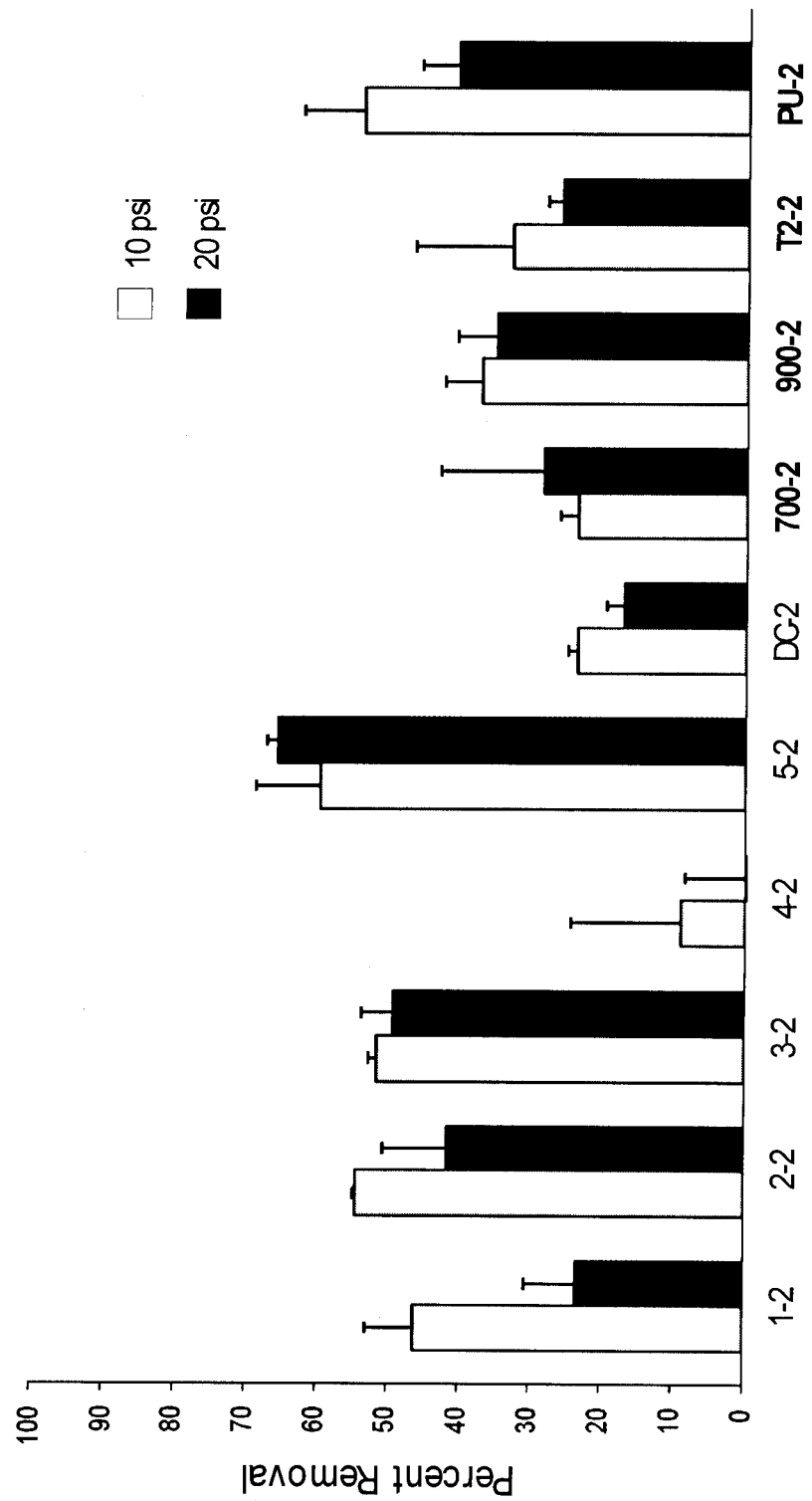
FIG. 17 depicts N. incerta cell adhesion after two weeks of preleaching of Zwitterionic/amphiphilic polyurethane coatings, acrylic-polyurethane control, commercial fouling-release coatings and silicone control coatings using water jet at 15 psi and 25 psi.
Figure 18:
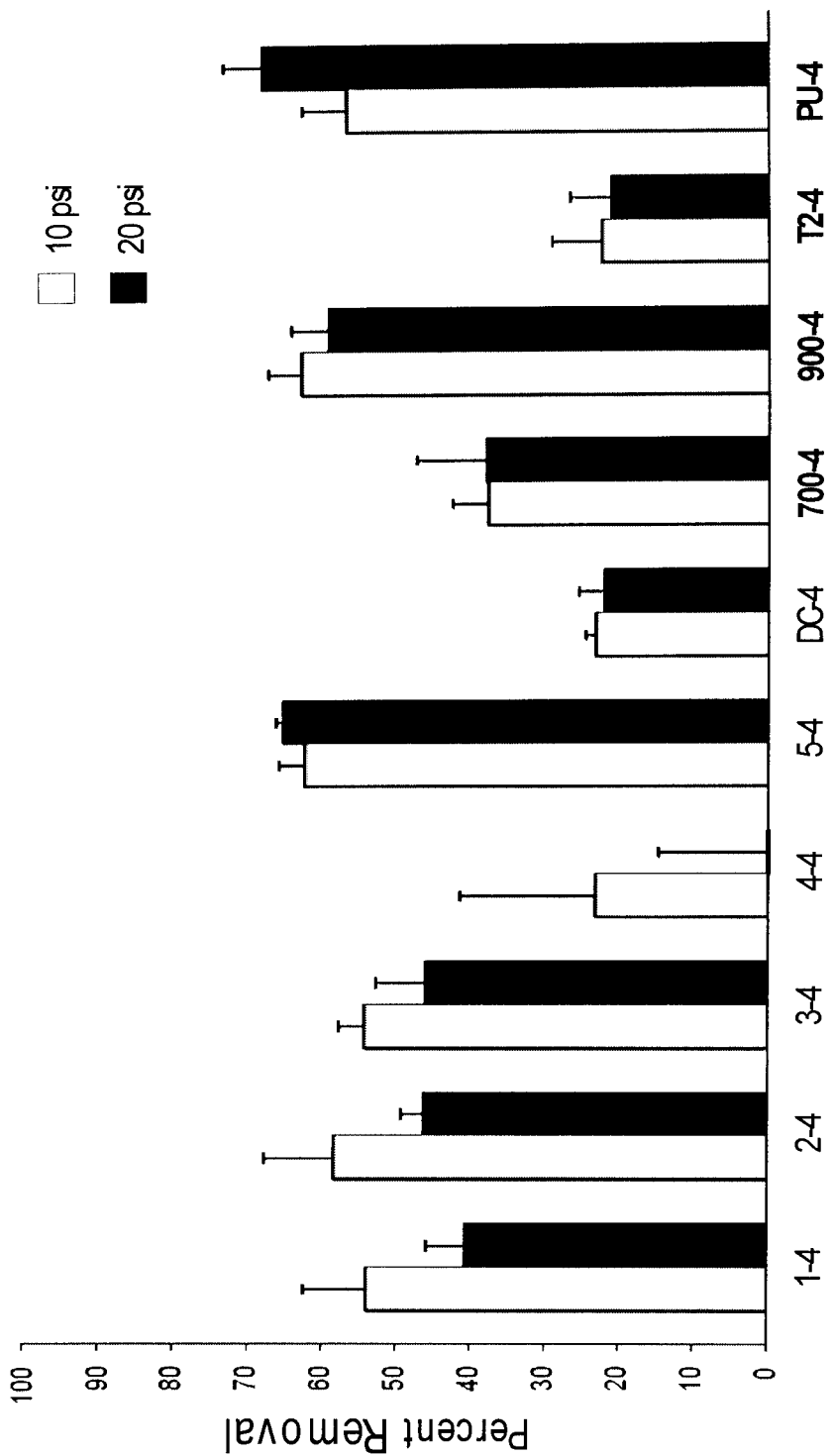
FIG. 18 depicts N. incerta cell adhesion after four weeks of preleaching of Zwitterionic/amphiphilic polyurethane coatings, acrylic-polyurethane control, commercial fouling-release coatings and silicone control coatings using water jet at 15 psi and 25 psi.

Water jet adhesion was carried out after 24 hrs of algal cell growth. Algal cell attachment was reported as the percent removal for each pressure indicated above. Error bars represent one standard deviation of the mean. *N. incerta* is known to adhere well to silicone surfaces and poorly to more polar surfaces. Thus, the removal for coatings 5-2 and PU-2 is good, while removal from control coatings based on silicones, such as DC and T2 is poor (FIG. 17). With the exception of coating 4, removal from the experimental coatings is better than the silicone controls at two weeks of preleaching, and approaching that of the polyurethane controls (FIG. 17). However, after four weeks of preleaching, removal from the experimental coatings is approaching that of the polyurethane controls (FIG. 18).

Evaluation with the Marine Fouling Barnacle *A. amphitrite*

Coatings were analyzed after 2 weeks of water immersion and daily feeding of the barnacles with brine shrimp. A hand held digital force gauge, mounted to an automated stage, was used to measure the peak force of release for each barnacle. Adhesion strength in shear was calculated by dividing the measured force required to remove the barnacle by the basal area and reported in Megapascals (MPa). Each data point is the mean value of nine individual barnacle measurements. Error bars represent one standard deviation of the mean.

Figure 19:
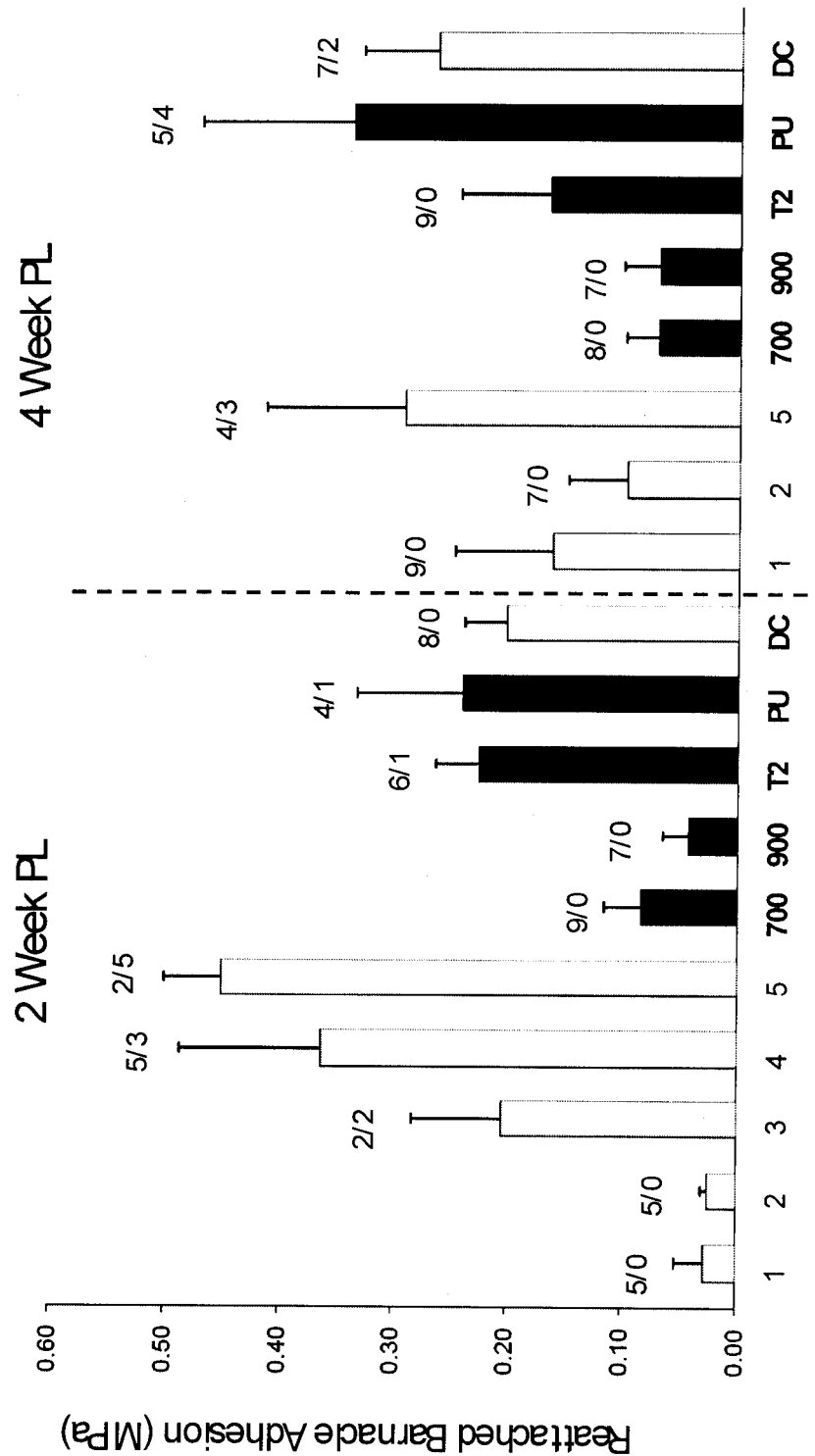
FIG. 19 depicts the reattachment barnacle adhesion of Zwitterionic/amphiphilic polyurethane coatings, acrylic-polyurethane control, commercial fouling-release coatings and silicone control coatings using water jet at 15 psi and 25 psi.

In FIG. 19, the ratio above each data point equals the number of measured barnacles to number of broken barnacles. Broken barnacles indicate that the barnacle shell or baseplate broke or fractured before failure of the barnacle adhesive to the coating surface (typical for poor fouling-release surfaces such as polyurethane). The data indicates that the novel coatings have low values of barnacle adhesion, with coatings 1 and 2 having lower adhesion values than the best commercial controls, 700 and 900.

The data from all of the biological assays indicates that the novel coatings are able to resist fouling/have low fouling adhesion for the broad variety of fouling organisms tested. While fouling adhesion to silicone coatings is low for organisms such as barnacles and marine bacteria, adhesion by diatoms is known to be high. Thus, these novel coatings are able to resist fouling by marine bacteria, barnacles and also by diatoms.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A pentablock copolymer prepared from atom transfer radical polymerization of a Poly(dimethylsiloxane)-Poly(ethyleneoxide)-Br macroinitiator and [2-(Methacryloyloxy)ethyl]dimethyl-(3-sulfopropyl)ammonium hydroxide).

2. A curable coating composition comprising: the pentablock copolymer according to claim 1, a polyol and a polyisocyanate.

3. A curable coating composition according to claim 2, wherein the polyol is selected from the group consisting of: polyester, polyether, polycarbonate, and acrylic.

4. A curable coating composition according to claim 3, wherein the polyol is an an acrylic polyol.

5. A curable coating composition according to claim 2, wherein the polyisocyanate is selected from the group consisting of: an aromatic isocyanate; a cycloaliphatic isocyanate; and an aliphatic isocyanate.

6. A curable coating composition according to claim 5, wherein the polyisocyanate is a triisocyanurate resin prepared from isophorone diisocyanate.

7. A curable coating composition according to claim 2, wherein the polyol is an acrylic polyol comprising 80% by weight butyl acrylate and 20% by weight of 2-hydroxyethyl acrylate and wherein the polyisocyanate is a triisocyanurate resin prepared from isophorone diisocyanate.

8. A curable coating composition according to claim 2, wherein the copolymer comprises from about 1 to about 50 percent by weight of the coating composition.

9. A curable coating composition according to claim 8, wherein the copolymer comprises from about 1 to about 15 percent by weight.

10. A cured coating prepared from the coating composition according to claim 2, wherein the cured coating is non-fouling.

11. A cured coating according to claim 2, wherein the cured coating is antifouling.

12. A cured coating according to claim 2, wherein the cured coating has a hydrophilic surface.

13. An object coated with the curable coating composition according to claim 2 wherein the curable coating composition is subsequently cured.

* * * * *

UNITED STATES PATENT AND TRADEMARK OFFICE
CERTIFICATE OF CORRECTION

PATENT NO.       : 8,629,210 B2                                     Page 1 of 1
APPLICATION NO.  : 13/123323
DATED            : January 14, 2014
INVENTOR(S)      : Webster et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this
Twenty-second Day of September, 2015

Michelle K. Lee
*Director of the United States Patent and Trademark Office*